US009728793B2

United States Patent
Takai et al.

(10) Patent No.: US 9,728,793 B2
(45) Date of Patent: Aug. 8, 2017

(54) JOINING DEVICE AND JOINING METHOD INVOLVING ACQUISTION OF A PARAMETER RELATING TO EXPANSION OR CONTRACTION

(71) Applicant: TOYOTA JIDOSHA KABUSHIKI KAISHA, Toyota-shi, Aichi-ken (JP)

(72) Inventors: Hiromu Takai, Miyoshi (JP); Yutaka Sugie, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/765,661

(22) PCT Filed: Feb. 7, 2014

(86) PCT No.: PCT/JP2014/000649
§ 371 (c)(1),
(2) Date: Aug. 4, 2015

(87) PCT Pub. No.: WO2014/122936
PCT Pub. Date: Aug. 14, 2014

(65) Prior Publication Data
US 2015/0372325 A1    Dec. 24, 2015

(30) Foreign Application Priority Data
Feb. 8, 2013    (JP) .................................. 2013-022971

(51) Int. Cl.
*B32B 38/00* (2006.01)
*H01M 8/0297* (2016.01)
(Continued)

(52) U.S. Cl.
CPC ....... *H01M 8/0297* (2013.01); *B32B 38/1841* (2013.01); *B29C 65/02* (2013.01);
(Continued)

(58) Field of Classification Search
CPC . B29C 66/93431; B29C 66/94; B29C 66/942; B29C 66/9421; B29C 66/944;
(Continued)

(56) References Cited

U.S. PATENT DOCUMENTS

2003/0064279 A1    4/2003   Yoshida et al.
2007/0116999 A1    5/2007   Kuramochi et al.
(Continued)

FOREIGN PATENT DOCUMENTS

JP    2003-173788    6/2003
JP    2005-129292    5/2005
(Continued)

OTHER PUBLICATIONS

Translation of JP 2008103251 A, published May 2008, Inventor Tomura, Seiji.*

*Primary Examiner* — George Koch
(74) *Attorney, Agent, or Firm* — Finnegan, Henderson, Farabow, Garrett & Dunner, LLP

(57) ABSTRACT

There is provided a technique that readily performs positioning of a joining member relative to a strip member during conveyance. A joining device 100 joins a gas diffusion layer 7 with a first catalyst electrode layer 2 of a strip body 5r which is a continuous strip member of a membrane electrode assembly 5, while conveying the strip body 5r. A controller 101 of the joining device 100 obtains a detection time $t_d$ based on a detection signal of a catalyst layer detector 130 when a front end 3e of a second catalyst electrode layer 3 placed on the strip body 5r passes through a detection point DP. The controller 101 subsequently obtains a joining position reach time $t_r$ based on the detection time $t_d$ when the gas diffusion layer 7 reaches a press point PP of joining rollers 152. The controller 101 starts conveying the gas diffusion layer 7 by means of a transfer at a conveying start (Continued)

time $t_s$ that is obtained based on the joining position reach time $t_r$ and a specified speed pattern of the transfer 141.

5 Claims, 15 Drawing Sheets

(51) Int. Cl.
*B32B 38/18* (2006.01)
*H01M 8/1018* (2016.01)
*B29L 31/34* (2006.01)
*B29C 65/78* (2006.01)
*B29C 65/00* (2006.01)
*B29C 65/02* (2006.01)

(52) U.S. Cl.
CPC ...... *B29C 65/7802* (2013.01); *B29C 65/7894* (2013.01); *B29C 66/1122* (2013.01); *B29C 66/344* (2013.01); *B29C 66/472* (2013.01); *B29C 66/83413* (2013.01); *B29C 66/83415* (2013.01); *B29C 66/93431* (2013.01); *B29C 66/942* (2013.01); *B29C 66/961* (2013.01); *B29L 2031/3468* (2013.01); *B32B 2457/18* (2013.01); *H01M 2008/1095* (2013.01)

(58) Field of Classification Search
CPC ............. B29C 66/9441; B29C 66/9492; B29L 2031/3468; B32B 38/1841; B32B 2457/18; B32B 38/1825; B32B 38/1833; H01M 8/2097; H01M 2008/1095
USPC .................................................. 156/64, 378
See application file for complete search history.

(56) References Cited

U.S. PATENT DOCUMENTS

2010/0167176 A1 7/2010 Kawai
2013/0228946 A1* 9/2013 Comerio ............... B32B 37/203
264/40.7

FOREIGN PATENT DOCUMENTS

| JP | 2005-183182 | | 7/2005 |
| JP | 2008103251 A | * | 5/2008 |
| JP | 2008-311012 | | 12/2008 |
| JP | 2010-251136 | | 11/2010 |

\* cited by examiner

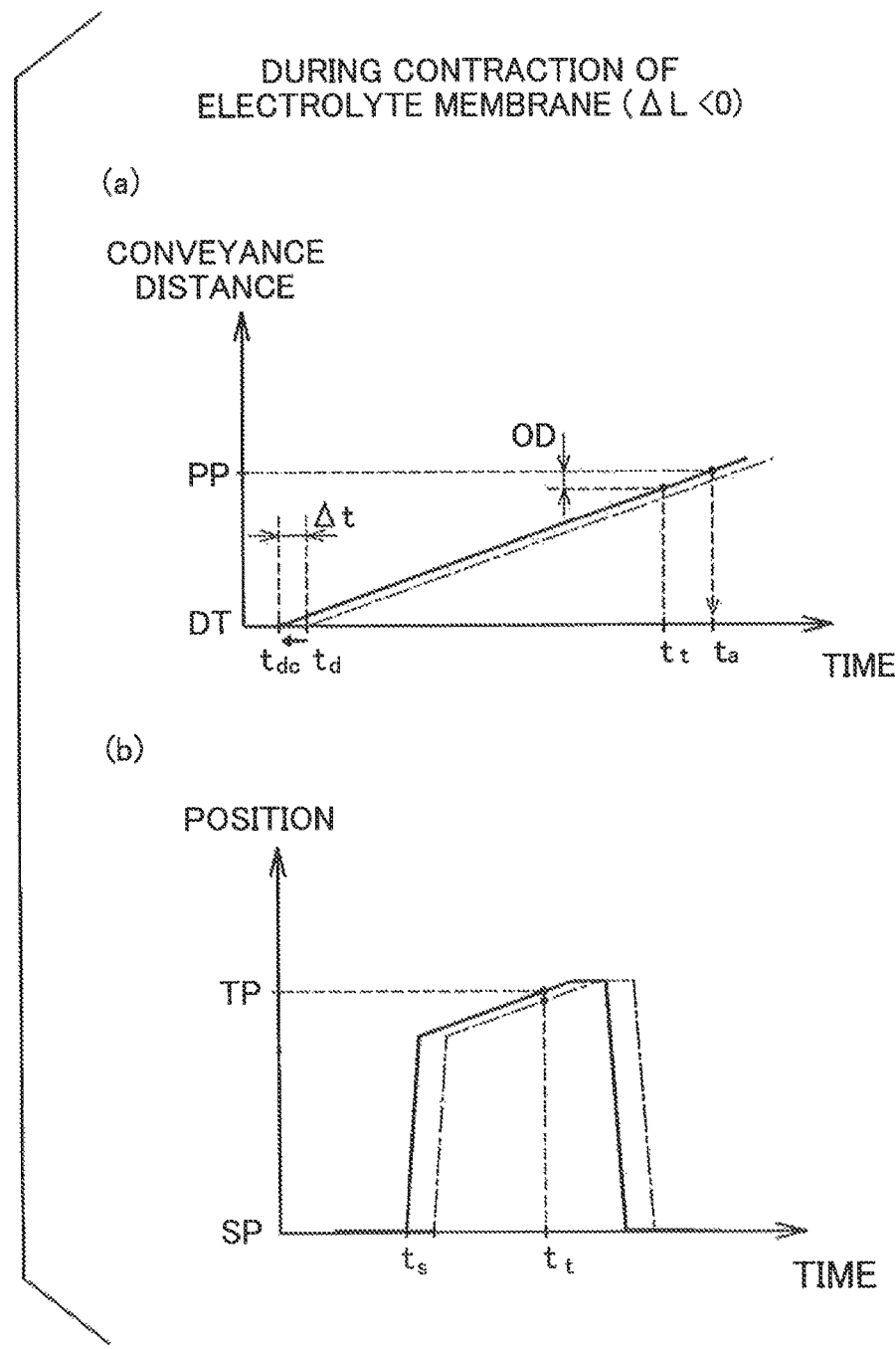

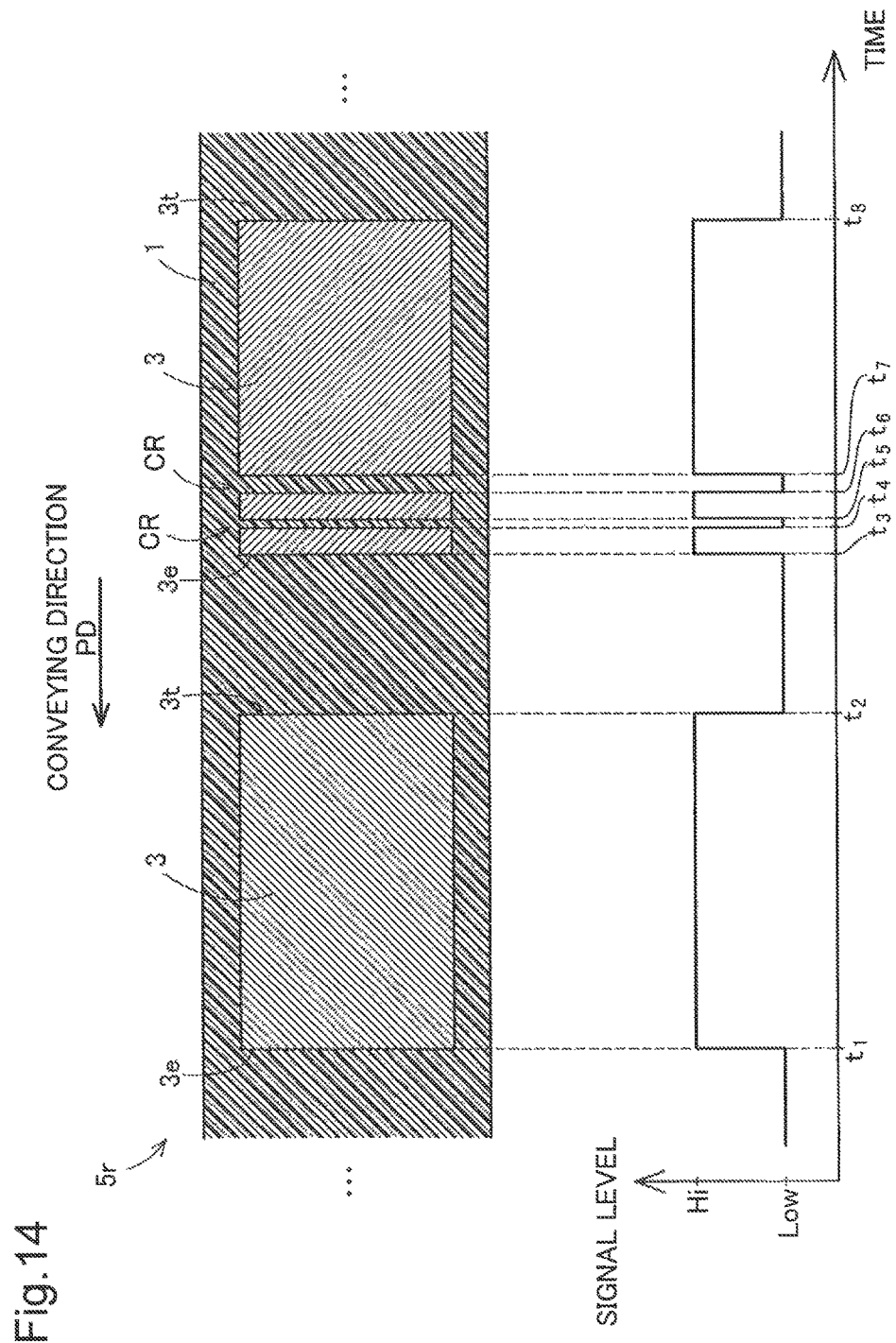

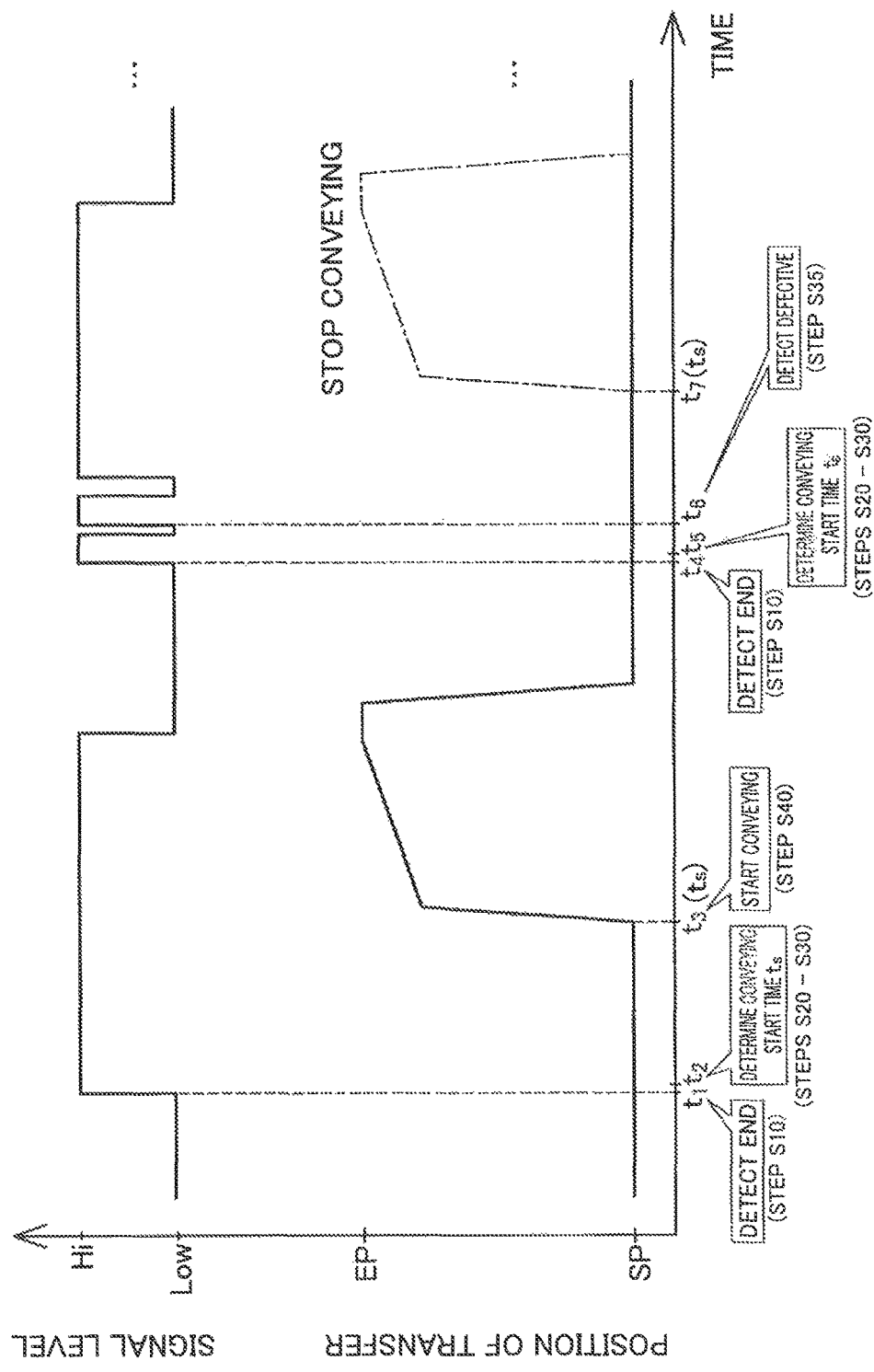

JOINING DEVICE AND JOINING METHOD INVOLVING ACQUISITION OF A PARAMETER RELATING TO EXPANSION OR CONTRACTION

CROSS-REFERENCE TO RELATED APPLICATIONS

This application is a national phase application of International Application No. PCT/JP2014/000649, filed Feb. 7, 2014, and claims the priority of Japanese Application No. 2013-022971, filed Feb. 8, 2013, the content of both of which is incorporated herein by reference.

TECHNICAL FIELD

The present invention relates to a joining device that continually joins a plurality of members with a strip member.

BACKGROUND ART

With regard to a manufacturing process of a fuel cell, a proposed technique continually joins components such as electrodes with a strip-like electrolyte membrane conveyed in a longitudinal direction to continually manufacture a plurality of membrane electrode assemblies. Patent Literature 1 (JP 2005-129292A) discloses a technique that joins diffusion layers on catalyst layers, which are continually arrayed at predetermined intervals on a web-like electrolyte membrane, by means of a joining roller and then continually cuts out membrane electrode assemblies by a cutting device. Patent Literature 2 (JP 2010-251136A) discloses a manufacturing device for a fuel cell that draws out and conveys a membrane electrode assembly wound in a roll, places component materials of the fuel cell on the membrane electrode assembly at predetermined intervals, and approximately simultaneously presses a plurality of the component materials of the fuel cell to be joined with the membrane electrode assembly. Patent literature 3 (JP 2005-183182A) discloses a manufacturing device for a fuel cell that rewinds and conveys an electrolyte membrane in a rolled-up state and sequentially and continually joins a gas diffusion layer and a separator with the electrolyte membrane.

SUMMARY

Technical Problem

The electrolyte membrane used for the fuel cell may be expanded or contracted by application of an external force or with a variation in wet state. Accordingly, in the process of continually joining the joining members with the strip-like electrolyte membrane during conveyance, the joining position of the joining member is likely to be deviated from a target position by expansion or contraction of the electrolyte membrane. With regard to the manufacturing process of the fuel cell, there is a need for a technique that performs positioning of the joining member relative to the electrolyte membrane with high efficiency and high accuracy.

The technique of Patent Literature 1 controls positioning of the gas diffusion layer based on the output value of a line sensor that detects the position of the catalyst layer. The technique of Patent Literature 1 adjusts the joining position of the gas diffusion layer relative to the electrolyte membrane by the moving and rotating operation of the joining roller. This complicates the control of the joining roller. The technique of Patent Literature 1 places the gas diffusion layer on a side surface of the joining roller, in order to convey the gas diffusion layer. Since the side surface of the joining roller is a curved surface, it is likely to misalign the placement position of the gas diffusion layer on the side surface of the joining roller. It is thus likely to reduce the accuracy of positioning of the joining position of the gas diffusion layer relative to the electrolyte membrane.

The technique of Patent Literature 2 aims to efficiently perform hot pressing of a gas diffusion layer for the purpose of improving the production efficiency of the fuel cell but does not take into account a variation in placement position of the gas diffusion layer on the electrolyte membrane. Accordingly, Patent Literature 2 discloses only the configuration that gas diffusion layers are arrayed at constantly fixed cycles.

The technique of Patent Literature 3 provides a positioning mark on the electrolyte membrane for positioning gas diffusion layers (GDL). The technique of Patent Literature 3 activates a GDL hot press at a timing when the positioning mark reaches a GDL assembling stage and places and joins the electrolyte membrane between and with GDLs on the respective sides. The technique of Patent Literature 3 conveys the GDLs in parallel to the electrolyte membrane at a speed synchronized with the conveyance speed of the electrolyte membrane and places and joins the GDLs with the electrolyte membrane at a predetermined timing. There is accordingly a need for conveyance control of the GDLs and control of the timing of placing and joining the GDLs with the electrolyte membrane with high accuracy. This is likely to complicate the control and the mechanism of the joining device.

As described above, there is still a room for improvement in adjusting the joining position of a member relative to the strip-like electrolyte membrane during conveyance in the manufacturing process of the fuel cell. This problem is not characteristic of the manufacturing process of the fuel cell but is commonly found in various manufacturing processes that continually join members with a strip member during conveyance. With regard to a general joining device that continually joins a plurality of members with a strip member during conveyance, other needs include simplifying a mechanism, reducing cost, saving resource, facilitating and simplifying control and improving convenience.

Solution to Problem

In order to solve at least part of the problems described above, the invention may be implemented by the following aspects.

(1) According to one aspect of the invention, there is provided a device that continually joins a plurality of joining members with a strip member. This device may comprise a first conveying assembly, a second conveying assembly, a joining roller, a detector and a conveyance controller. The first conveying assembly may be configured to convey in a longitudinal direction the strip member on which a plurality of placement members as indications of joining positions of the joining members are arrayed in the longitudinal direction. The second conveying assembly may be configured to convey the joining members to be joined with the strip member conveyed by the first conveying assembly. The joining roller may be configured to apply pressure to the strip member and each of the joining members and join the joining member with the strip member at a meeting point of the strip member and the joining member. The detector may be configured to detect passage of each of the placement members at a predetermined detection point on a conveyance path of the strip member. The conveyance controller may be configured to control the first conveying assembly and the second conveying assembly and determine a reach time when each of the joining members reaches the meeting point by the second conveying assembly, based on a detection time when passage of each of the placement members is detected by the detector. The device of this aspect readily performs positioning of the joining position of the joining member relative to the strip member during conveyance.

(2) In the device of the above aspect, the second conveying assembly may linearly convey each of the joining members toward the meeting point in a specified speed pattern to be joined with the strip member. The conveyance controller may determine a start time when the second conveying assembly starts conveying the joining member, based on the reach time and the specified speed pattern. The device of this aspect simplifies the conveyance mechanism of the joining member and the conveyance control.

(3) The device of the above aspect may further comprise a parameter acquirer configured to obtain a parameter related to an expanding or contracting state of the strip body. The conveyance controller may change the detection time according to the parameter and may determine the reach time based on the changed detection time. Even when the strip body is expanded or contracted during conveyance, the device of this aspect readily suppresses misalignment of the joining position of the joining member due to the expansion or contraction.

(4) In the device of the above aspect, the detector may detect passage of an end of each of the placement members. The conveyance controller may detect a defective placement member, based on a time interval of detecting respective ends of the placement member, and may control the second conveying assembly to stop conveying the joining member in response to detection of the defective placement member. The device of this aspect efficiently reduces the manufacturing failure by using the detection result by the detector.

(5) In the device of the above aspect, the strip member may be an electrolyte membrane for a fuel cell. The placement member may be a catalyst electrode layer for the fuel cell. The conveyance controller may determine the reach time such that a placement area of the joining member overlaps with a placement area of the catalyst electrode layer. The device of this aspect allows for readily positioning of the joining position of a component of the fuel cell, such as a gas diffusion layer or a separator, relative to the electrolyte membrane for the fuel cell with high accuracy by using the catalyst electrode layer as an indication. This accordingly enables the fuel cell to be efficiently manufactured.

(6) According to another aspect of the invention, there is provided a method that continually joins a plurality of joining members with a strip member. This method may comprise conveying in a longitudinal direction the strip member on which a plurality of placement members as indications of joining positions of the joining members are arrayed in the longitudinal direction; detecting passage of each of the placement members at a predetermined detection point on a conveyance path of the strip member; determining a reach time when each of the joining members reaches the strip member, based on a detection time when passage of each of the placement members is detected; conveying each of the joining members to be joined with the strip member at the reach time; and applying pressure to the strip member and each of the joining members and joining the joining member with the strip member at a meeting point of the strip member and the joining member.

All the plurality of components included in each of the aspects of the invention described above are not essential, but some components among the plurality of components may be appropriately changed, omitted or replaced with other components or part of the limitations may be deleted, in order to solve part or all of the problems described above or in order to achieve part or all of the advantageous effects described herein. In order to solve part or all of the problems described above or in order to achieve part or all of the advantageous effects described herein, part or all of the technical features included in one aspect of the invention described above may be combined with part or all of the technical features included in another aspect of the invention described later to provide still another independent aspect of the invention.

The invention may be actualized by any of various aspects other than the joining device and the joining method, for example, a joined component that is joined by the joining method or with the joining device, a control method of the joining method or the joining device, a computer program implementing the control method of the joining method or the joining device and a non-transitory storage medium in which such a computer program is stored.

BRIEF DESCRIPTION OF DRAWINGS

FIG. 12A is diagrams illustrating a process of obtaining the end reach time $t_a$ and the joining position reach time $t_r$ reflecting an amount of expansion or contraction $\Delta L$ and a process of obtaining the conveying start time $t_s$;

FIG. 14 is diagrams illustrating a method of detecting a defective second catalyst electrode layer by the controller; and FIG. 15 is diagram illustrating one example of timing chart in conveyance control of the gas diffusion layer in the joining device of the third embodiment.

DESCRIPTION OF EMBODIMENTS

A. First Embodiment

Figure 1:
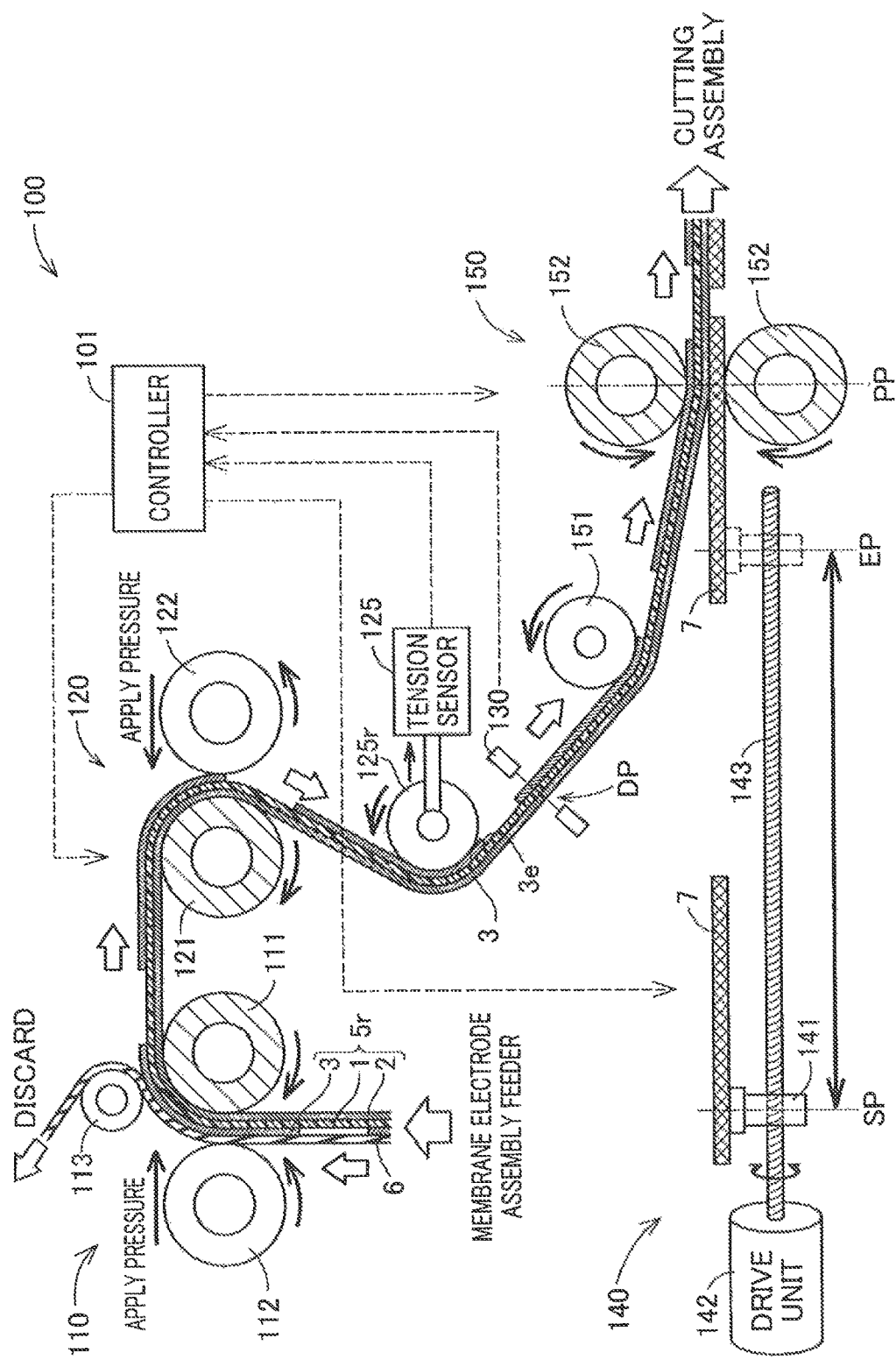
FIG. 1 is a schematic diagram illustrating the configuration of a joining device according to a first embodiment.

FIG. 1 is a schematic diagram illustrating the configuration of a joining device 100 according to a first embodiment of the invention. The joining device 100 is used in a manufacturing process of a polymer electrolyte fuel cell (hereinafter simply referred to as "fuel cell"). The joining device 100 is configured to continually join gas diffusion layers 7 at positions where catalyst electrode layers 3 are placed on a strip body 5r of membrane electrode assembly which is a continuous strip member of a membrane electrode assembly 5 as a power generation body of the fuel cell.

Figure 2:
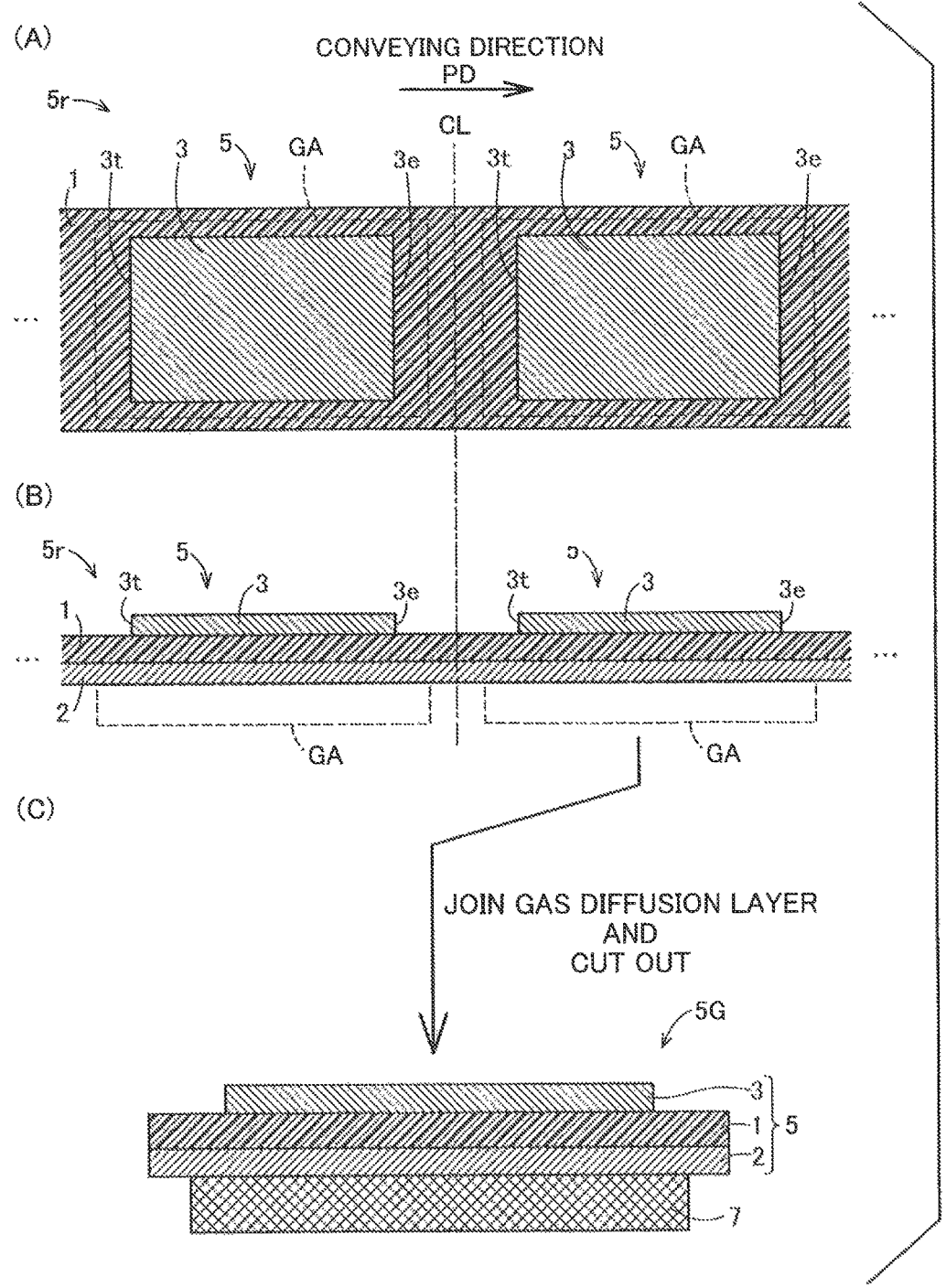
FIG. 2 is diagrams illustrating the structure of a strip body and the structure of a membrane electrode assembly cut from the strip body.

In the section (A) of FIG. 2, a front view illustrating a second catalyst electrode layer 3-side surface of the strip body 5r is shown. In the section (B) of FIG. 2, a schematic sectional view illustrating the structure of the strip body 5r is shown. In the section (C) of FIG. 2, a schematic sectional view of the membrane electrode assembly 5 joined with the gas diffusion layer 7 and cut from the strip body 5r, which is hereinafter referred to as "membrane electrode assembly with diffusion layer 5G", is shown. An arrow PD indicating a conveying direction of the strip body 5r is shown in the section (A) of FIG. 2. Areas GA in which the gas diffusion layers 7 are placed are shown by broken lines, and a cutting line CL along which the membrane electrode assembly with diffusion layer 5G is cut from the strip body 5r is shown by dashed line in the sections (A) and (B) of FIG. 2.

The strip body 5r includes an electrolyte membrane 1 in a strip form constituting a main body, a first catalyst electrode layer 2 placed on one surface of the electrolyte membrane 1 to cover over the entire surface, and a plurality of catalyst electrode layers 3 placed on the other surface of the electrolyte membrane 1 at predetermined intervals along the longitudinal direction as shown in FIG. 2. The electrolyte membrane 1 is a solid polymer thin film having good proton conductivity in the wet state and may be made of a fluorine-containing ion exchange resin such as Nafion (registered trademark).

Each of the first and the second catalyst electrode layers 2 and 3 is an electrode with gas diffusivity that receives supply of a reactive gas and serves as either an anode that is a fuel electrode or a cathode that is an oxidizing agent electrode. Each of the first and the second catalyst electrode layers 2 and 3 is formed as a dried coat of a catalyst ink that is a dispersed solution in which conductive particles with a catalyst for accelerating fuel cell reaction supported thereon (for example, platinum-supported carbon) and an electrolyte that is the same as or similar to the electrolyte of the electrolyte membrane 1 are dispersed.

In the joining device 100 of the first embodiment, the gas diffusion layers 7 are joined with the first catalyst electrode layer 2 at positions where the second catalyst electrode layers 3 are placed in the strip body 5r. In other words, according to this embodiment, the second catalyst electrode layer 3 serves as an indication of the position at which the gas diffusion layer 7 as a joining member is to be joined. The gas diffusion layer 7 may be made of a porous material having gas diffusivity and electrical conductivity or may be made of a fibrous base material having electrical conductivity such as carbon paper or carbon cloth.

In the description hereof, with regard to ends of the second catalyst electrode layer 3, one end on a front side in the conveying direction of the strip body 5r is called "front end 3e", and the other end on a rear side is called "rear end 3f". In the joining device 100 of the first embodiment, in the process of joining the gas diffusion layer 7, the position of the front end 3e of the second catalyst electrode layer 3 is used as a reference of joining position (as described later in detail).

In the membrane electrode assembly with diffusion layer 5G of the first embodiment (shown in the section (C) of FIG. 2), the position of the outer edge of the first catalyst electrode layer 2 is approximately aligned with the position of the outer edge of the electrolyte membrane 1, while the position of the outer edge of the second catalyst electrode layer 3 is located on the inner side of the outer edge of the electrolyte membrane 1. In other words, in the membrane electrode assembly with diffusion layer 5G of the first embodiment, the outer edges of the first and the second catalyst electrode layer 2 and 3 are located away from each other across the outer edge of the electrolyte membrane 1. This configuration suppresses cross leakage, i.e., crossover of the unreacted reactive gas between the edges of the two catalyst electrode layers 2 and 3 during power generation.

In the membrane electrode assembly with diffusion layer 50G of the first embodiment, the outer edge of the gas diffusion layer 7 is located between the outer edges of the first and the second catalyst electrode layers 2 and 3 and does not directly come into contact with the electrolyte membrane 1. This configuration suppresses fluff of fibers or burr on the outer edge of the gas diffusion layer 7 from being stuck into the surface of the electrolyte membrane 1. In the case that hydrogen peroxide radical is generated in the gas diffusion layer 7 during power generation of the fuel cell, this configuration causes the hydrogen peroxide radical to inevitably pass through the first catalyst electrode layer 2 before reaching the electrolyte membrane 1. Accordingly, the hydrogen peroxide radical generated in the gas diffusion layer 7 is removed by the catalytic function of the first catalyst electrode layer 2. This configuration thus suppresses degradation of the electrolyte membrane 1 caused by the hydrogen peroxide radical.

The joining device 100 of the first embodiment (shown in FIG. 1) includes a controller 101, a slip sheet peeling assembly 110, a tension adjuster 120, a catalyst layer detector 130, a gas diffusion layer conveying assembly 140 and a joining assembly 150. In the joining device 100, the respective components 110, 120 and 140 configured to convey the strip body 5r correspond to the first conveying assembly, and the gas diffusion layer conveying assembly 140 configured to convey the gas diffusion layer 7 corresponds to the second conveying assembly. The controller 101 is implemented by a microcomputer including a central processing unit and a main storage unit. The controller 101 serves as a conveyance controller to control conveyance of the strip body 5r from the slip sheet peeling assembly 110 through the tension adjuster 120 to the joining assembly 150. The controller 101 also controls conveyance of the gas diffusion layers 7 by the gas diffusion layer conveying assembly 140. The controller 101 controls conveyance of the gas diffusion layers 7 based on output signals of the catalyst layer detector 130, so as to adjust the positions where the gas diffusion layers 7 are to be joined as described later in detail.

The joining device 100 receives the strip body 5r fed by a membrane electrode assembly feeder whose illustration and detailed description are omitted. A slip sheet 6 is bonded to the second catalyst electrode layer 3-side surface of the strip body 5r. The slip sheet peeling assembly 110 peels off the slip sheet 6 from the strip body 5r while conveying the strip body 5r in the longitudinal direction. The slip sheet peeling assembly 110 includes a drive roller 111, a pressure roller 112 and a slip sheet conveyance roller 113.

The drive roller 111 is connected with a motor which is not shown in figures and is rotated and driven at an approximately constant speed under control of the controller 101. The pressure roller 112 and the slip sheet conveyance roller 113 are respectively located in parallel to the drive roller 111 at positions adjacent to the drive roller 111 so as to rotate following the drive roller 111. The pressure roller 112 is located upstream, and the slip sheet conveyance roller 113 is located downstream of the pressure roller 112.

The strip body 5r with the slip sheet 6 bonded thereto is drawn in and conveyed between the drive roller 111 and the pressure roller 112, such that the slip sheet 6 is in contact with the pressure roller 112. The pressure roller 112 presses the strip body 5r against the drive roller 111 and applies a pressure to the strip body 5r. The strip body 5r pressed by the pressure roller 112 is conveyed along the side face of the drive roller 111 and is subsequently drawn in and conveyed between the drive roller 111 and the slip sheet conveyance roller 113. The slip sheet conveyance roller 113 rotates with adsorbing the slip sheet 6, so as to peel off the slip sheet 6 from the strip body 5r. The slip sheet 6 peeled off from the strip body 5r is collected in a slip sheet collector, which is not shown in figures, and is discarded.

The tension adjuster 120 is placed after the slip sheet peeling assembly 110 and serves to adjust the tension applied to the strip body 5r while conveying the strip body 5r. The tension adjuster 120 includes a drive roller 121, a pressure roller 122 and a tension sensor 125. The drive roller 121 is connected with a motor, which is not shown in figures, and is rotated and driven at a rotation speed determined by an instruction from the controller 101. The pressure roller 122 is located in parallel to the drive roller 121 at a position adjacent to the drive roller 121 so as to rotate following the drive roller 121.

The strip body 5r conveyed from the slip sheet peeling assembly 110 is drawn to between the drive roller 121 and the pressure roller 122, such that the first catalyst electrode layer 2-side surface faces the drive roller 121 and the second catalyst electrode layer 3-side surface faces the pressure roller 122. The strip body 5r is conveyed by the rotational driving force of the drive roller 121, while receiving pressure applied by the pressure roller 122.

The tension sensor 125 detects the tension of the strip body 5r fed by the drive roller 121 and the pressure roller 122. The tension sensor 125 includes a rotating roller 125r that rotates along with conveyance of the strip body 5r while pressing the strip body 5r to apply tension to the strip body 5r. The tension sensor 125 detects the tension of the strip body 5r, based on a reactive force which the rotating roller 125r receives from the strip body 5r. The tension sensor 125 outputs the detected tension to the controller 101.

In response to an output signal from the tension sensor 125, the controller 101 controls the rotation speed of the drive roller 121 to keep the tension of the strip body 5r substantially constant and adjusts the tension of the strip body 5r before the strip body 5r reaches the joining assembly 150. More specifically, when the tension of the strip body 5r is higher than a target value, the controller 101 increases the rotation speed of the drive roller 121 to decrease the tension of the strip body 5r. When the tension of the strip body 5r is lower than the target value, on the other hand, the controller 101 decreases the rotation speed of the drive roller 121 to increase the tension of the strip body 5r.

The catalyst layer detector 130 is implemented by, for example, an optical sensor including a light-emitting element and a light-receiving element. The catalyst layer detector 130 detects that the second catalyst electrode layer 3 passes through a predetermined position (hereinafter called "detection point DP") in the conveyance path of the strip body 5r in downstream of the tension adjuster 120, and outputs a detection signal to the controller 101. The catalyst layer detector 130 serves as a passage detector that detects passage of a placement member. The controller 101 detects passage of the front end 3e of the second catalyst electrode layer 3 in response to the detection signal of the catalyst layer detector 130 and controls a conveying process of the gas diffusion layer 7 by the gas diffusion layer conveying assembly 140 based on the time of detection.

The gas diffusion layer conveying assembly 140 performs the conveying process of conveying the gas diffusion layer 7 to a press point PP of joining rollers 152 of the joining assembly 150 in response to an instruction from the controller 101. The gas diffusion layer conveying assembly 140 includes a transfer 141, a drive unit 142 and a driveshaft 143. The driveshaft 143 is connected with the drive unit 142 and is rotated by the rotational driving force of the drive unit 142. The transfer 141 is mounted to the driveshaft 143 and linearly reciprocates in a predetermined interval (between a start position SP and an end position EP) along the axial direction of the driveshaft 143 with rotation of the driveshaft 143.

At the start position SP, the transfer 141 receives one gas diffusion layer 7 at a time fed from a storage of the gas diffusion layer 7 (illustration is omitted). The transfer 141 keeps the gas diffusion layer 7 parallel to the moving direction by vacuum suction and linearly moves from the start position SP to the end position EP near to the joining assembly 150, so as to join the gas diffusion layer 7 with the strip body 5r at the press point PP that is the meeting point. The transfer 141 repeats the reciprocation between the start position SP and the end position EP in a specified speed pattern (described later) in order to join each gas diffusion layer 7.

The joining assembly 150 joins the gas diffusion layer 7 on the first catalyst electrode layer 2 of the strip body 5r by pressing. The joining assembly 150 includes a conveyance roller 151 and a set of joining rollers 152. The conveyance roller 151 guides the strip body 5r to the press point PP of the joining rollers 152, while applying a predetermined tension to the strip body 5r to change the conveyance angle of the strip body 5r such that the conveyance angle of the strip body 5r is at an acute angle to the conveyance angle of the gas diffusion layer 7.

The joining rollers 152 are rotated at such a speed as to maintain a substantially constant conveying speed of the strip body 5r under feedback control by the controller 101. The strip body 5r and the gas diffusion layer 7 are joined and pressed at the press point PP of the joining rollers 152. The strip body 5r which the gas diffusion layers 7 are joined with is fed to a cutting assembly (illustration and detailed description are omitted), in order to cut out each membrane electrode assembly with diffusion layer 5G.

Figure 3:
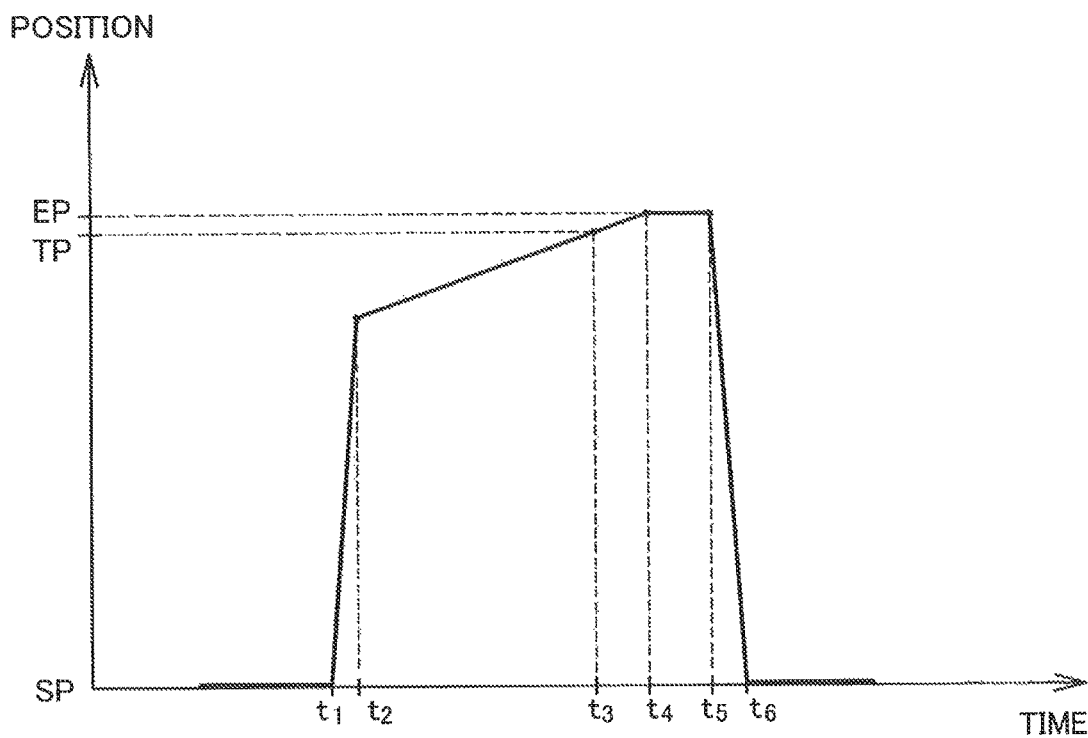
FIG. 3 is a diagram illustrating a specified speed pattern of a transfer in a conveying process of a gas diffusion layer.

FIG. 3 is a diagram illustrating the specified speed pattern of the transfer 141 in the conveying process of the gas diffusion layer 7. FIG. 3 is a graph showing the relationship of the position of the transfer 141 to the time in the conveying process of the gas diffusion layer 7. Before starting the conveying process of the gas diffusion layer 7, the transfer 141 stands by in the state that the fed gas diffusion layer 7 is received at the start position SP. The transfer 141 starts moving when receiving an instruction to start conveying the gas diffusion layer 7 from the controller 101. The transfer 141 first moves at a significantly high speed from a time $t_1$ to a time $t_2$.

In the joining device 100, the strip body 5r is conveyed at a substantially constant conveying speed by the rotations of the drive roller 111 of the slip sheet peeling assembly 110 and the joining rollers 152 of the joining assembly 150. The transfer 141 moves at a relatively low speed synchronized with the conveying speed of the strip body 5r from the time $t_2$ to a time $t_4$ at which the transfer 141 reaches the end position EP. Hereinafter the period from the time $t_2$ to the time $t_4$ in the specified speed pattern of the transfer 141 is called "speed synchronizing period". The transfer 141 stops at the end position EP, waits for a predetermined time and then returns from the end position EP to the start position SP at a relatively high speed (from a time $t_5$ to a time $t_6$).

Figure 4:
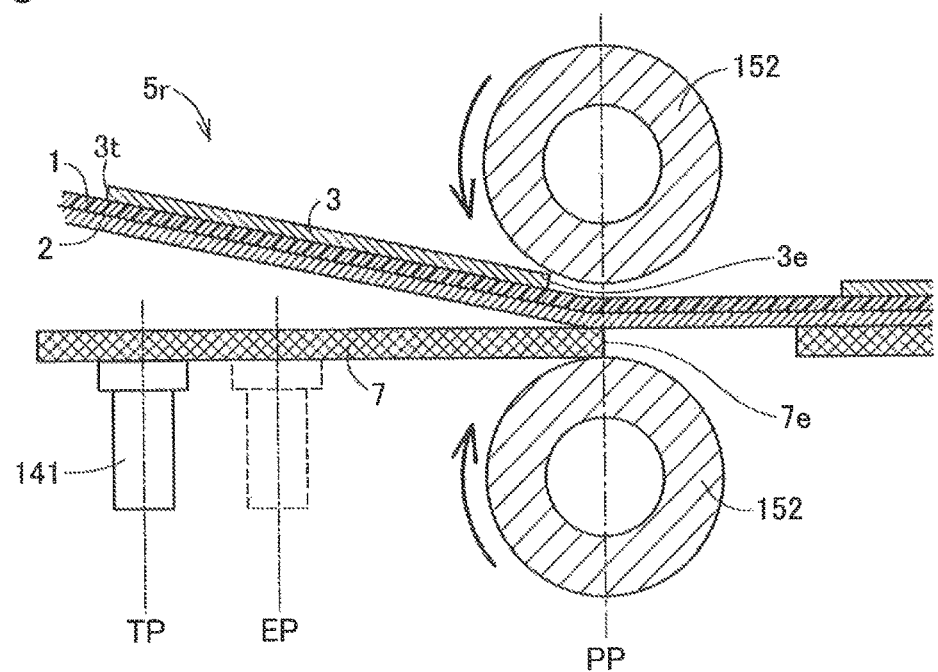
FIG. 4 is a schematic diagram illustrating a mechanism of drawing the gas diffusion layer from the transfer to between joining rollers.

FIG. 4 is a schematic diagram illustrating a mechanism of drawing the gas diffusion layer 7 from the transfer 141 to between the joining rollers 151. FIG. 4 schematically illustrates the state that one end of the gas diffusion layer 7 on a front side (hereinafter called "front end 7e") in the conveyance direction of the gas diffusion layer 7 reaches the press point PP of the joining rollers 152 by conveying the transfer 141. The transfer 141 located at the end position EP is shown by the broken line in FIG. 4.

In the joining device 100 of the first embodiment, the front end 7e of the gas diffusion layer 7 reaches the press point PP of the joining rollers 152 when the transfer 141 reaches a predetermined position before the end position EP. Hereinafter this position of the transfer 141 is called "end reach position TP". The transfer 141 reaches the end reach position TP at a predetermined time $t_3$ in the speed synchronizing period in which the transfer 141 moves at the speed synchronized with the conveying speed of the strip body 5r (shown in FIG. 3). Accordingly, the front end 7e of the gas diffusion layer 7 is joined with the strip body 5r at the synchronized conveying speed.

After the front end 7e of the gas diffusion layer 7 reaches the press point PP, the transfer 141 continues moving to the end position EP at the speed synchronized with the conveying speed of the strip body 5r and feeds the gas diffusion layer 7 to the press point PP of the joining rollers 152. When stopping at the end position EP, the transfer 141 releases vacuum suction of the gas diffusion layer 7.

After release of vacuum suction by the transfer 141, the gas diffusion layer 7 is drawn to the press point PP by the rotational driving force of the joining rollers 152. The transfer 141 waits for a predetermined time at the end position EP and supports a rear portion of the gas diffusion layer 7 that is drawn to the press point PP.

Figure 5:
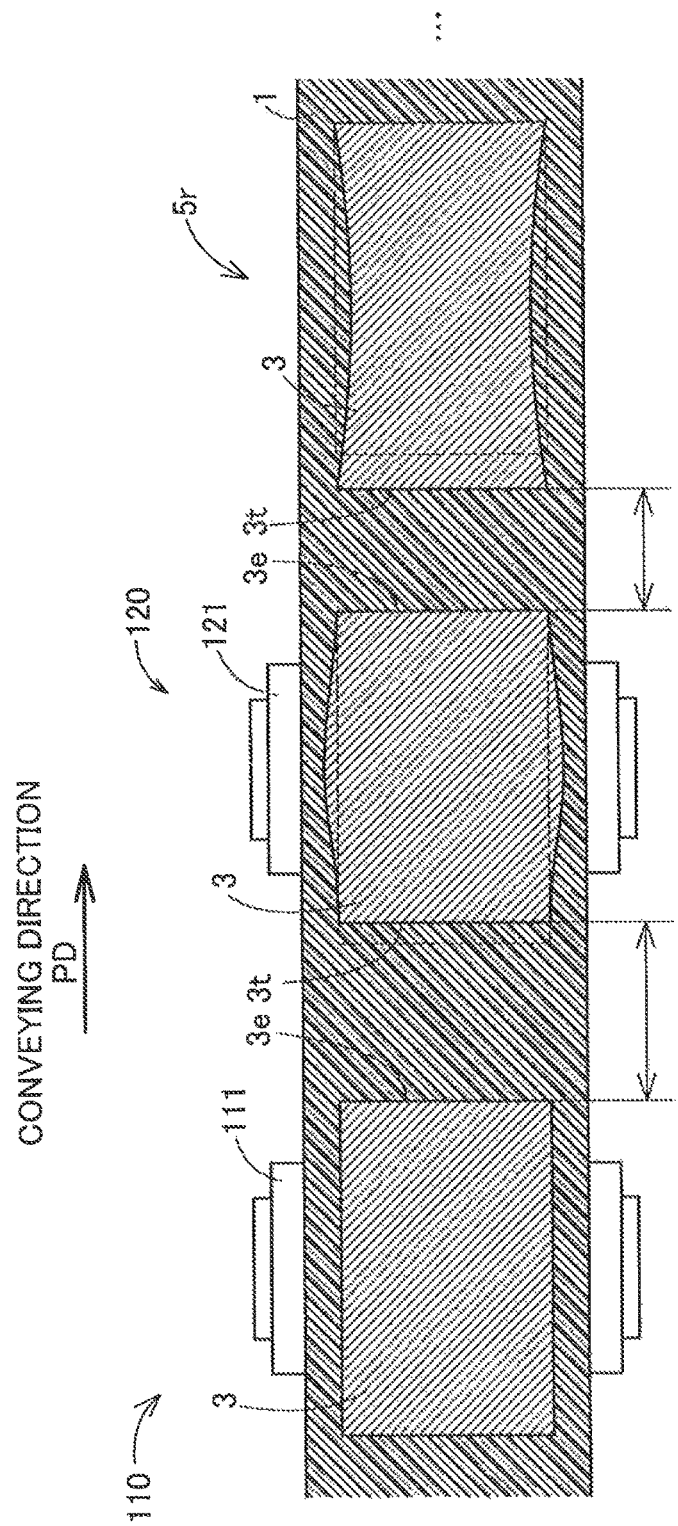
FIG. 5 is a schematic diagram illustrating a variation in interval of second catalyst electrode layers during conveyance of the strip body.

FIG. 5 is a schematic diagram illustrating a variation in interval of the second catalyst electrode layers 3 accompanied with expanding or contracting deformation during conveyance of the strip body 5r. FIG. 5 schematically illustrates the strip body 5r conveyed by the drive roller 111 of the slip sheet peeling assembly 110 and the drive roller 121 of the tension adjuster 120, viewed from the second catalyst electrode layer 3-side. The arrow PD indicating the conveying direction of the strip body 5r is shown in FIG. 5.

As described above, in the joining device 100 of the first embodiment, the controller 101 controls the rotation speed of the drive roller 121 of the tension adjuster 120, so as to adjust the tension of the strip body 5r. Accordingly, in the joining device 100 of the first embodiment, an external force which the strip body 5r receives from the drive roller 121 of the tension adjuster 120 may be varied to expand or contract the strip body 5r in the conveying direction.

Contraction or expansion of the strip body 5r in the conveying direction may compress or stretch the second catalyst electrode layer 3 in the conveying direction and may vary the interval between the second catalyst electrode layers 3. Additionally, the interval between the second catalyst electrode layers 3 of the strip body 5r may be varied by swelling or contracting deformation of the electrolyte membrane 1 according to the wet condition and a manufacturing error when the second catalyst electrode layers 3 are placed on the electrolyte membrane 1.

Accordingly, when the gas diffusion layers 7 are conveyed and joined at fixed periods, the variation in interval between the second catalyst electrode layers 3 is likely to cause misalignment of the joining position of the gas diffusion layer 7. In the joining device 100 of the first embodiment, the controller 101 accordingly controls the gas diffusion layer conveying assembly 140 to start the conveying process of the gas diffusion layer 7 in response to a detection signal of the catalyst layer detector 130, so as to suppress misalignment of the joining position of the gas diffusion layer 7. This is described concretely below.

Figure 6:
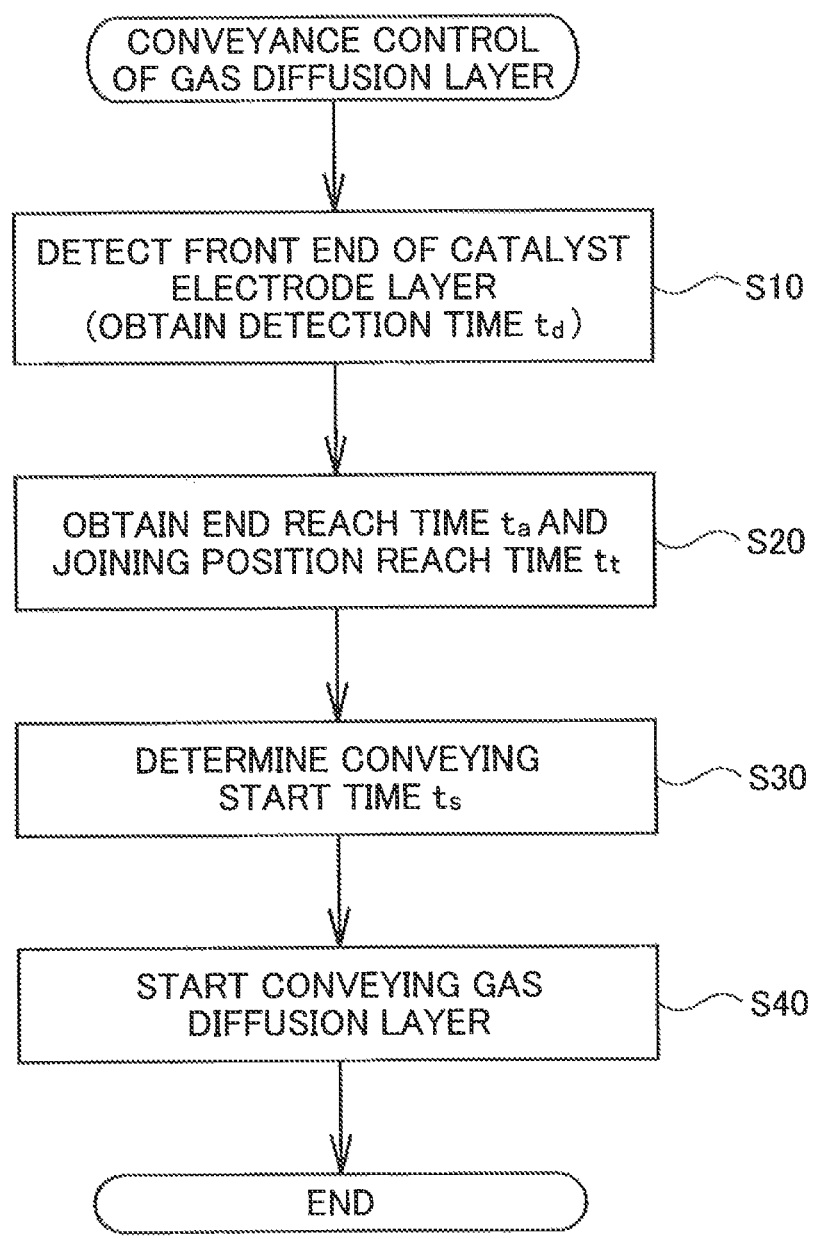
FIG. 6 is a flowchart showing a procedure of conveyance control of the gas diffusion layer by a controller.

FIG. 6 is a flowchart showing a procedure of conveyance control of the gas diffusion layer by the controller 101. The controller 101 repeatedly performs a series of processing of steps S10 to S40 described below on each occasion of joining the gas diffusion layer 7. At step S10, the controller 101 detects passage of the front end 3e of the second catalyst electrode layer 3 in response to a detection signal from the catalyst layer detector 130 and obtains a detection time $t_d$.

Figure 7:
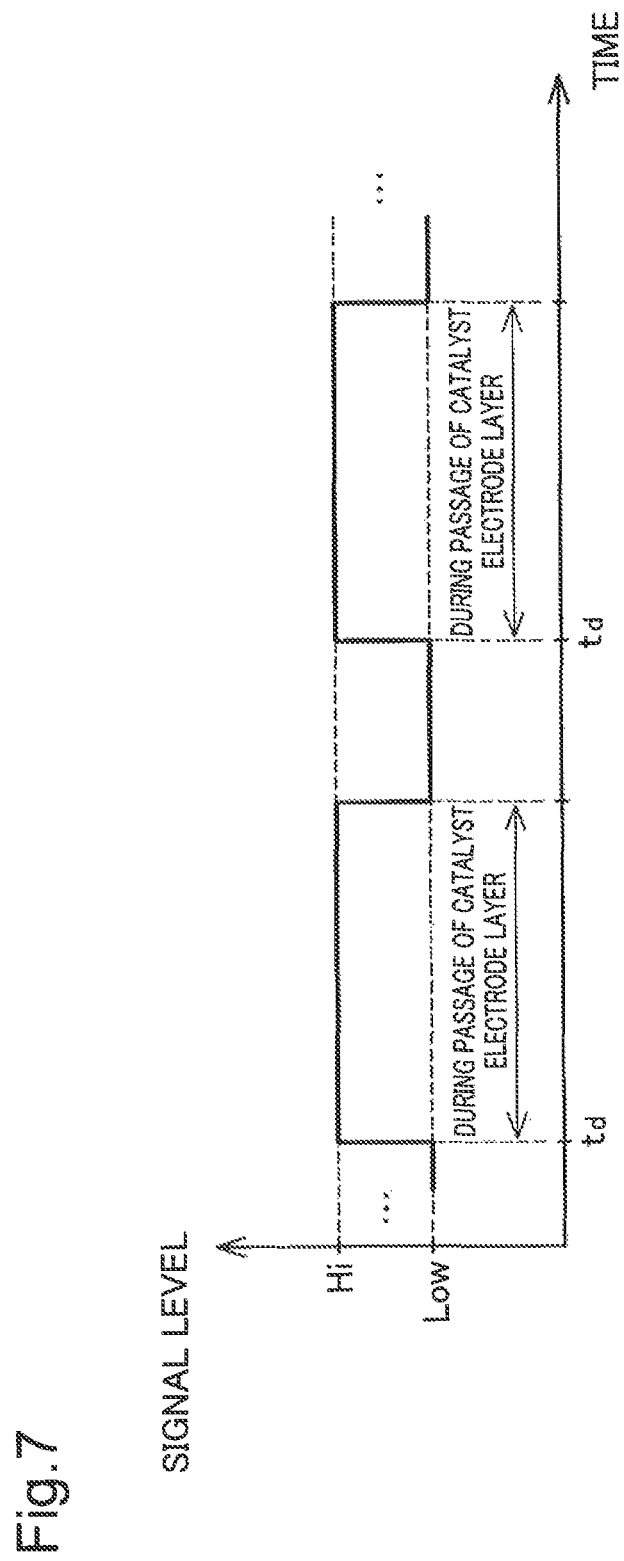
FIG. 7 is a diagram illustrating a process of obtaining a detection time.

FIG. 7 is a diagram illustrating the process of obtaining the detection time $t_d$ at step S10. FIG. 7 is a graph showing one example of the detection signal output from the catalyst layer detector 130 to the controller 101 with signal level as ordinate and time as abscissa. The catalyst layer detector 130 outputs a Hi signal during passage of the second catalyst electrode layer 3 and otherwise outputs a Low signal. The controller 101 detects a rising edge in the detection signal of the catalyst layer detector 130 at which the signal level is changed from Low to Hi by passage of the second catalyst electrode layer 3 and obtains the time when the rising edge is detected. Hereinafter, the obtained time is called "detection time $t_d$".

At step S20 in FIG. 6, the controller 101 obtains a time when the front end 3e of the second catalyst electrode layer 3 reaches the press point PP of the joining rollers 152, based on the detection time $t_d$ obtained at step S10. Hereinafter, the time that is obtained at step S20 is called "end reach time $t_a$". The controller 101 also obtains a time when the joining position of the strip body 5r at which the front end 7e of the gas diffusion layer 7 is joined with the strip body 5r reaches the press point PP relative to the end reach time $t_a$ as the reference. Hereinafter, the obtained time is referred to as "joining position reach time $t_r$".

Figure 8:
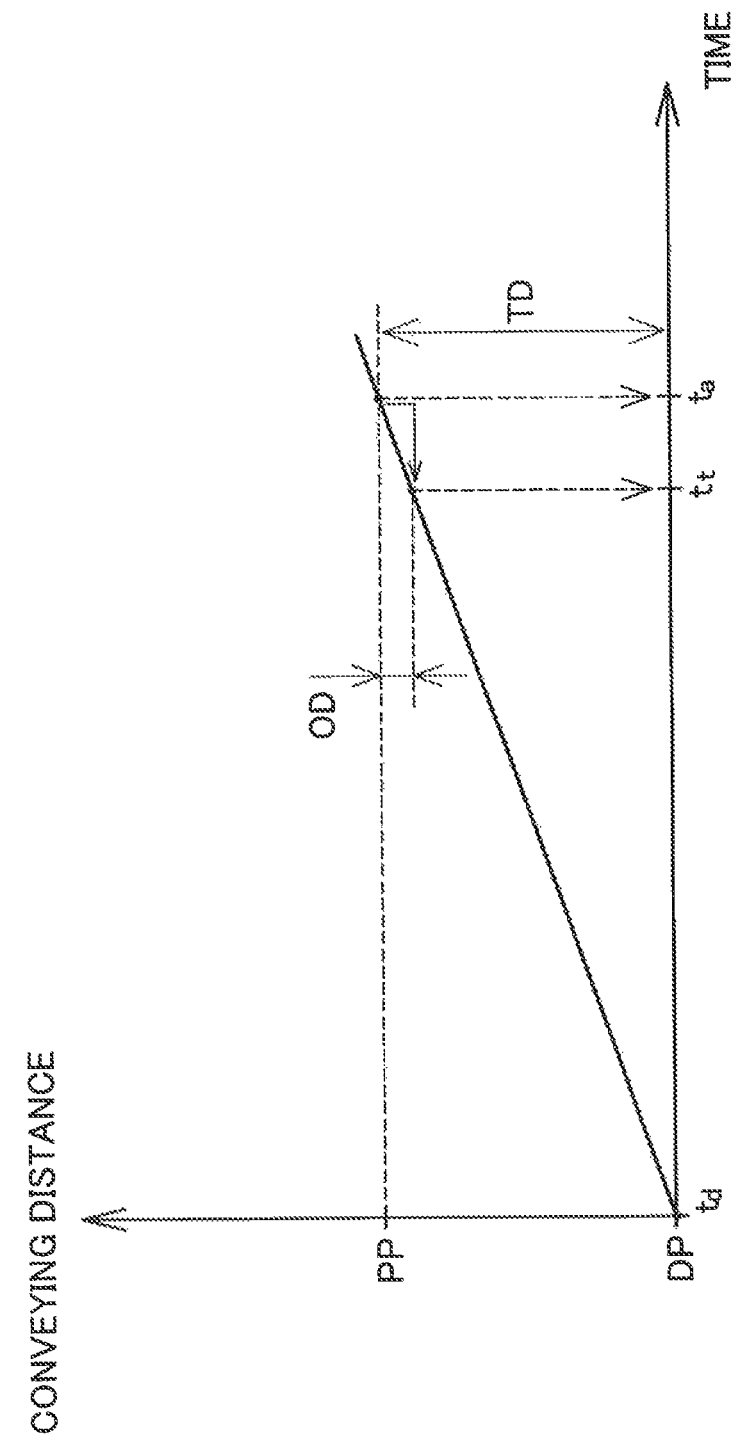
FIG. 8 is a diagram illustrating a process of obtaining an end reach time and a joining position reach time.

FIG. 8 is a diagram illustrating the process of obtaining the end reach time $t_a$ and the joining position reach time $t_r$ at step S20. FIG. 8 is a graph showing the relationship of the conveying distance of the second catalyst electrode layer 3 to the time in the joining device 100. The joining device 100 of the first embodiment, which is shown in FIG. 1, has a constant conveying speed of the strip body 5r and a known conveying distance TD of the strip body 5r between the detection point DP of the catalyst layer detector 130 and the press point PP of the joining rollers 152. Accordingly, the controller 101 obtains the end reach time $t_a$, based on the conveying speed of the strip body 5r and the conveying distance TD.

In the membrane electrode assembly with diffusion layer 5G of the first embodiment (shown in FIG. 2), the outer edge of the gas diffusion layer 7 is located at a position away from the position of the outer edge of the second catalyst electrode layer 3 outward by a predetermined distance that is hereinafter called "separation distance OD". The joining position of the strip body 5r at which the front end 7e of the gas diffusion layer 7 is joined with the strip body 5r thus reaches the press point PP of the joining rollers 152 prior to the front end 3e of the second catalyst electrode layer 3 by the separation distance OD. Accordingly, the controller 101 obtains the joining position reach time $t_r$ relative to the end reach time $t_a$ as the reference, based on the conveying speed of the strip body 5r and the separation distance OD.

At step S30 in FIG. 6, the controller 101 determines a time at which moving the transfer 141 to convey the gas diffusion layer 7 starts, based on the joining position reach time $t_r$ obtained at step S20. Hereinafter, the determined time is called "conveying start time $t_s$". More specifically, the controller 101 determines the time that allows the front end 7e of the gas diffusion layer 7 to reach the press point PP at the joining position reach time $t_r$ in the process of moving the transfer 141 in the specified speed pattern shown in FIG. 3, as the conveying start time $t_s$.

Figure 9:
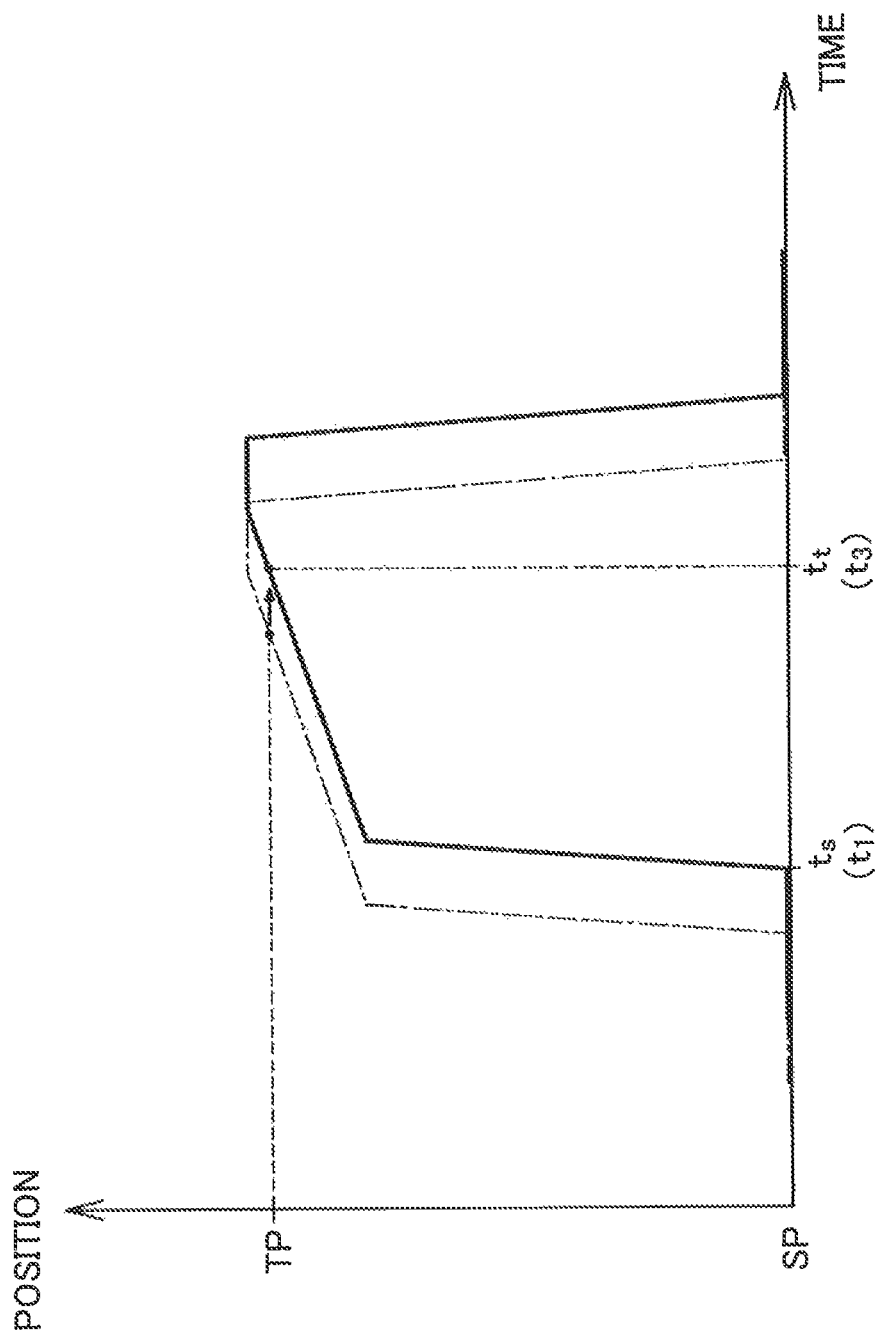
FIG. 9 is a diagram illustrating a process of determining a conveying start time.

FIG. 9 is a diagram illustrating the process of determining the conveying start time $t_s$ at step S30. FIG. 9 is a graph similar to the graph showing the specified speed pattern of the transfer 141 described in FIG. 3. As a matter of convenience, FIG. 9 schematically illustrates the state that the graph showing the specified speed pattern is shifted along the time axis by determining the conveying start time $t_s$.

As described above, in the joining device 100 of the first embodiment, the front end 7e of the gas diffusion layer 7 reaches the press point PP at the predetermined time $t_3$ in the speed synchronizing period in the specified speed pattern of the transfer 141 shown in FIG. 3. The predetermined time $t_3$ is then set to the joining position reach time $t_r$ obtained at step S20, and a time $t_1$ as a starting point of the specified speed pattern in this state is determined as the conveying start time $t_s$.

At step S40 in FIG. 6, the controller 101 starts conveying the gas diffusion layer 7 by means of the transfer 141 when the time reaches the conveying start time $t_s$ determined at step S30. This accordingly allows the front end 7e of the gas diffusion layer 7 to reach the press point PP at the joining position reach time $t_r$ and accordingly enables the gas diffusion layer 7 to be joined at a predetermined joining position relative to the position of the front end 3e of the second catalyst electrode layer 3 as the reference.

As described above, in the joining device 100 of the first embodiment, the controller 101 determines the joining position reach time $t_r$ when the front end 7e of the gas diffusion layer 7 reaches the press point PP of the joining rollers 152 and thereby adjusts the joining position of the gas diffusion layer 7. This accordingly facilitates positioning of the joining position of the gas diffusion layer 7 relative to the strip body 5r.

In the joining device 100 of the first embodiment, the front end 7e of the gas diffusion layer 7 reaches the press point PP of the joining rollers 152 by means of the transfer 141 in the specified speed pattern described above, and joining the gas diffusion layer 7 with the strip body 5r is started. Accordingly, this adjusts the joining position of the gas diffusion layer 7 relative to the strip body 5r by controlling the start timing of moving the transfer 141, and thus readily and quickly adjusts the joining position of the gas diffusion layer 7 based on the detection timing of the second catalyst electrode layer 3.

Additionally, in the joining device 100 of the first embodiment, the transfer 141 linearly moves horizontally. This facilitates control of the moving speed of the transfer 141 and suppresses the joining position of the gas diffusion layer 7 from being misaligned by an error of the moving speed of the transfer 141. In the joining device 100 of the first embodiment, the gas diffusion layer 7 is joined with the strip body 5r when the conveying speed of the gas diffusion layer 7 is synchronized with the conveying speed of the strip body 5r. This enables the gas diffusion layer 7 to be smoothly joined with the strip body 5r and suppresses misalignment of the position of the gas diffusion layer 7 to be joined. This accordingly enhances the adjustment accuracy of the joining position of the gas diffusion layer 7.

B. Second Embodiment

Figure 10:
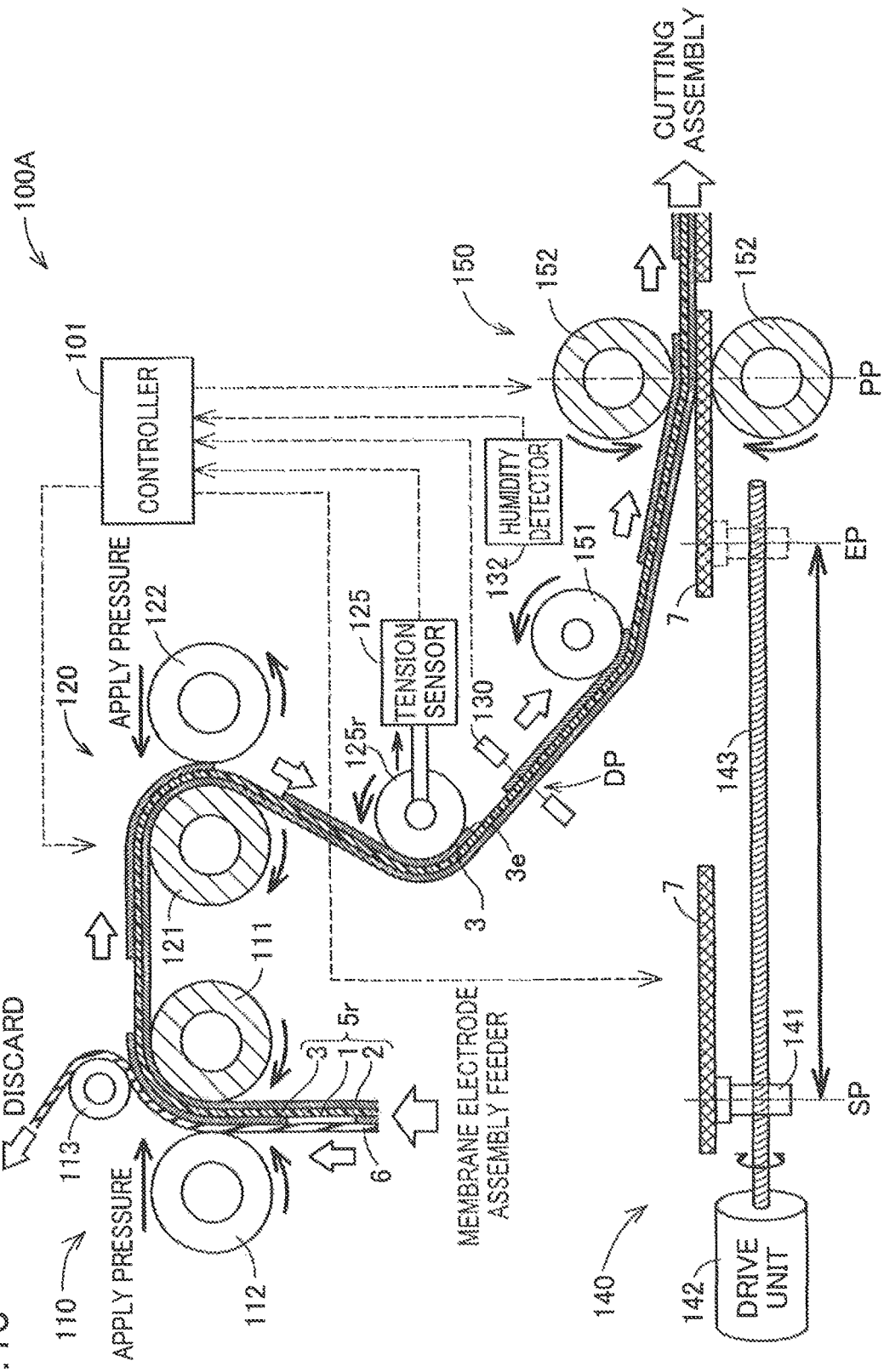
FIG. 10 is a schematic diagram illustrating the configuration of a joining device according to a second embodiment.

FIG. 10 is a schematic diagram illustrating the configuration of a joining device 100A according to a second embodiment of the invention. The joining device 100A of the second embodiment is substantially similar to the joining device 100 of the first embodiment (shown in FIG. 1), except addition of a humidity detector 132. The humidity detector 132 corresponds to the parameter acquirer and serves to detect the humidity in the conveyance path of the strip body 5r between the detection point DP and the press point PP as a parameter related to expansion and contraction of the strip body 5r and output the detected humidity to the controller 101.

As described above, the electrolyte membrane 1 forming the main body of the strip body 5r is swollen and contracted according to the wet condition. Under some wet condition in the conveyance path of the strip body 5r between the detection point DP and the press point PP, the strip body 5r is likely to be swollen or contracted in the conveying direction after passing through the detection point DP. In the joining device 100A of the second embodiment, the controller 101 adjusts the conveying start time $t_s$ of the gas diffusion layer 7 by the transfer 141 according to the detection value of the humidity detector 132 and thereby suppresses misalignment of the joining position of the gas diffusion layer 7 due to a variation in wettability in the conveyance path of the strip body 5r. This is described concretely below.

Figure 11:
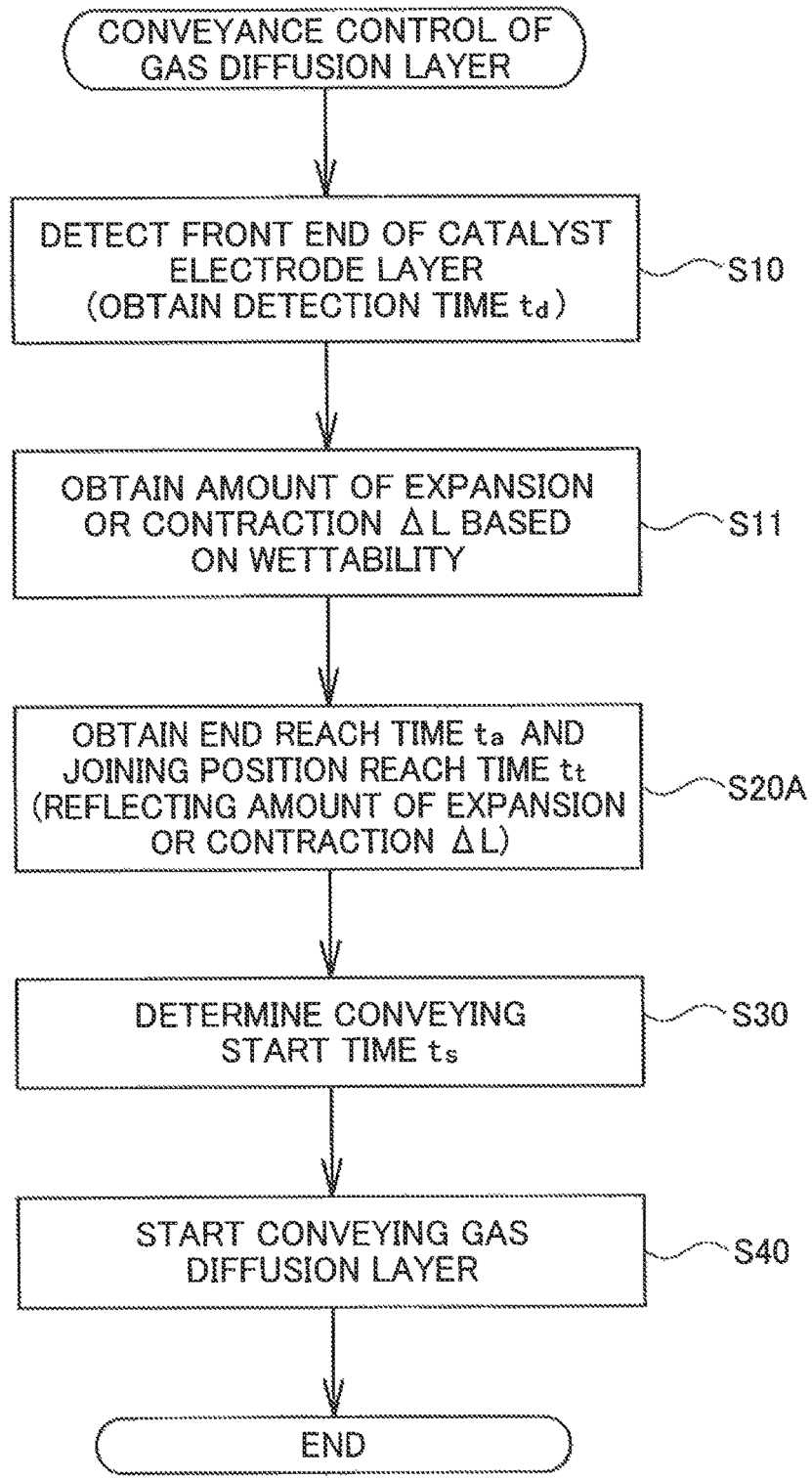
FIG. 11 is a flowchart showing a procedure of conveyance control of the gas diffusion layer by the controller of the second embodiment.

FIG. 11 is a flowchart showing a procedure of conveyance control of the gas diffusion layer by the controller 101 of the joining device 100A of the second embodiment. The procedure of conveyance control of the gas diffusion layer in the second embodiment is substantially similar to the procedure of conveyance control of the gas diffusion layer in the first embodiment (shown in FIG. 6), except addition of step S11 and replacement of step S20 with step S20A.

After detecting that the front end 3e of the second catalyst electrode layer 3 has passed through the detection point DP, the controller 101 obtains an amount of expansion or contraction ΔL in the conveying direction of the strip body 5r according to the detection value of the humidity detector 132 at step S11. More specifically, the controller 101 provides in advance a map showing a variation in amount of expansion or contraction of the electrolyte membrane 1 against the humidity and obtains the amount of expansion or contraction ΔL using this map. This map sets the relationship such that the amount of expansion or contraction ΔL is equal to 0 at the wettability equal to a reference value, increases in the positive direction at the wettability higher than the reference value and increases in the negative direction at the wettability lower than the reference value.

Figure 12B:
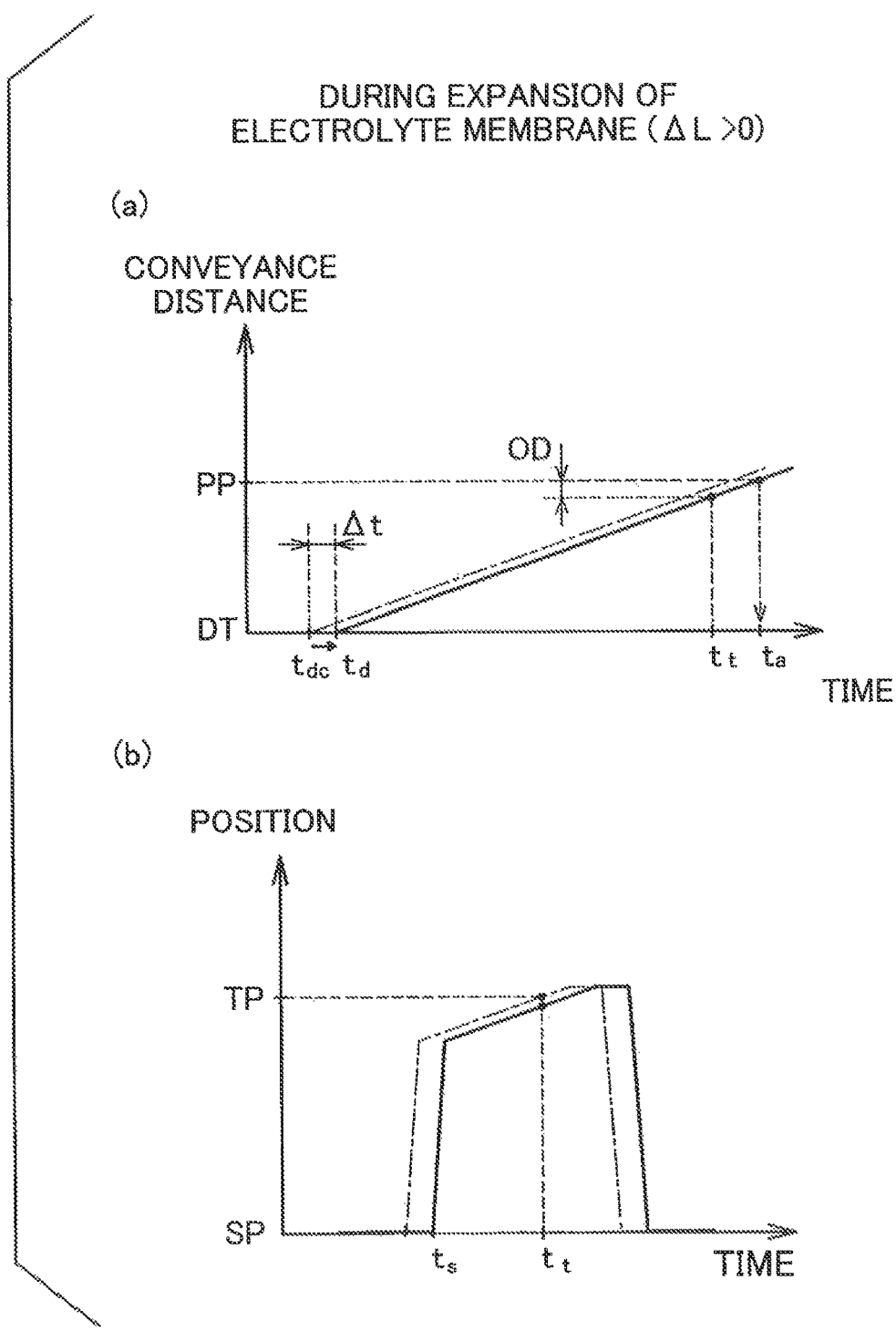
FIG. 12B is diagrams illustrating a process of obtaining the end reach time $t_a$ and the joining position reach time $t_r$ reflecting the amount of expansion or contraction $\Delta L$ and a process of obtaining the conveying start time $t_s$.

FIGS. 12A and 12B are diagrams respectively illustrating a process of obtaining the end reach time $t_a$ and the joining position reach time $t_t$ reflecting the amount of expansion or contraction ΔL at step S20A and a process of obtaining the conveying start time $t_s$ at step S30. FIG. 12A is diagrams in the case that the value of the amount of expansion or contraction ΔL indicates contraction of the electrolyte membrane 1 (ΔL<0), and FIG. 12B is diagrams in the case that the value of the amount of expansion or contraction ΔL indicates expansion of the electrolyte membrane 1 (ΔL>0). In each of FIGS. 12A and 12B, a graph similar to the graph of FIG. 8 for describing the process of step S20A is illustrated in the upper section (a), and a graph similar to the graph of FIG. 9 for describing the process of step S30 is illustrated in the lower section (b). In the respective diagrams of FIGS. 12A and 12B, graphs at the amount of expansion or contraction ΔL equal to 0 are shown by the dashed line.

At step S20A, the controller 101 obtains a correction amount Δt (Δt>0) of conveyance time with regard to the amount of expansion or contraction ΔL based on the amount of expansion or contraction ΔL obtained at step S11 and the conveying speed of the strip body 5, and obtains a corrected detection time $t_{dc}$ by correcting the detection time $t_d$ with the correction amount Δt. More specifically, the controller 101 subtracts the correction amount Δt from the detection time $t_d$ ($t_{dc}=t_d \cdot \Delta t$) at the value of the amount of expansion or contraction ΔL indicating contraction of the electrolyte membrane 1, while adding the correction amount Δt to the detection time $t_d$ ($t_{dc}=t_d+\Delta t$) at the value of the amount of expansion or contraction ΔL indicating expansion of the electrolyte membrane 1.

The controller 101 uses the corrected detection time $t_{dc}$ in place of the detection time $t_d$ and obtains the end reach time $t_a$ and the joining position reach time $t_t$ like the process of step S20 described in the first embodiment. In this case, the joining position reach time $t_t$ has a value reflecting the amount of expansion or contraction ΔL of the electrolyte membrane according to the wettability. At step S30, the controller 101 obtains the conveying start time $t_s$ using the joining time reach time $t_t$ obtained at step S20A and the specified speed pattern of the transfer 141, in the same manner as that described in the first embodiment.

When the electrolyte membrane 1 is expanded in the conveying direction according to the wettability, this advances the conveying start time $t_s$ by the amount of expansion or contraction ΔL shown in FIG. 12A, so as to offset the joining position of the gas diffusion layer 7 to the upstream side in the conveying direction. When the electrolyte membrane 1 is contracted in the conveying direction according to the wettability, on the other hand, this delays the conveying start time $t_s$ by the amount of expansion or contraction ΔL shown in FIG. 12B, so as to offset the joining position of the gas diffusion layer 7 to the downstream side in the conveying direction.

As described above, the joining device 100A of the second embodiment readily adjusts the joining position of the gas diffusion layer 7 by reflecting the amount of expansion or contraction ΔL of the electrolyte membrane 1 according to the wettability, thus enhancing the accuracy of positioning of the gas diffusion layer 7.

C. Third Embodiment

Figure 13:
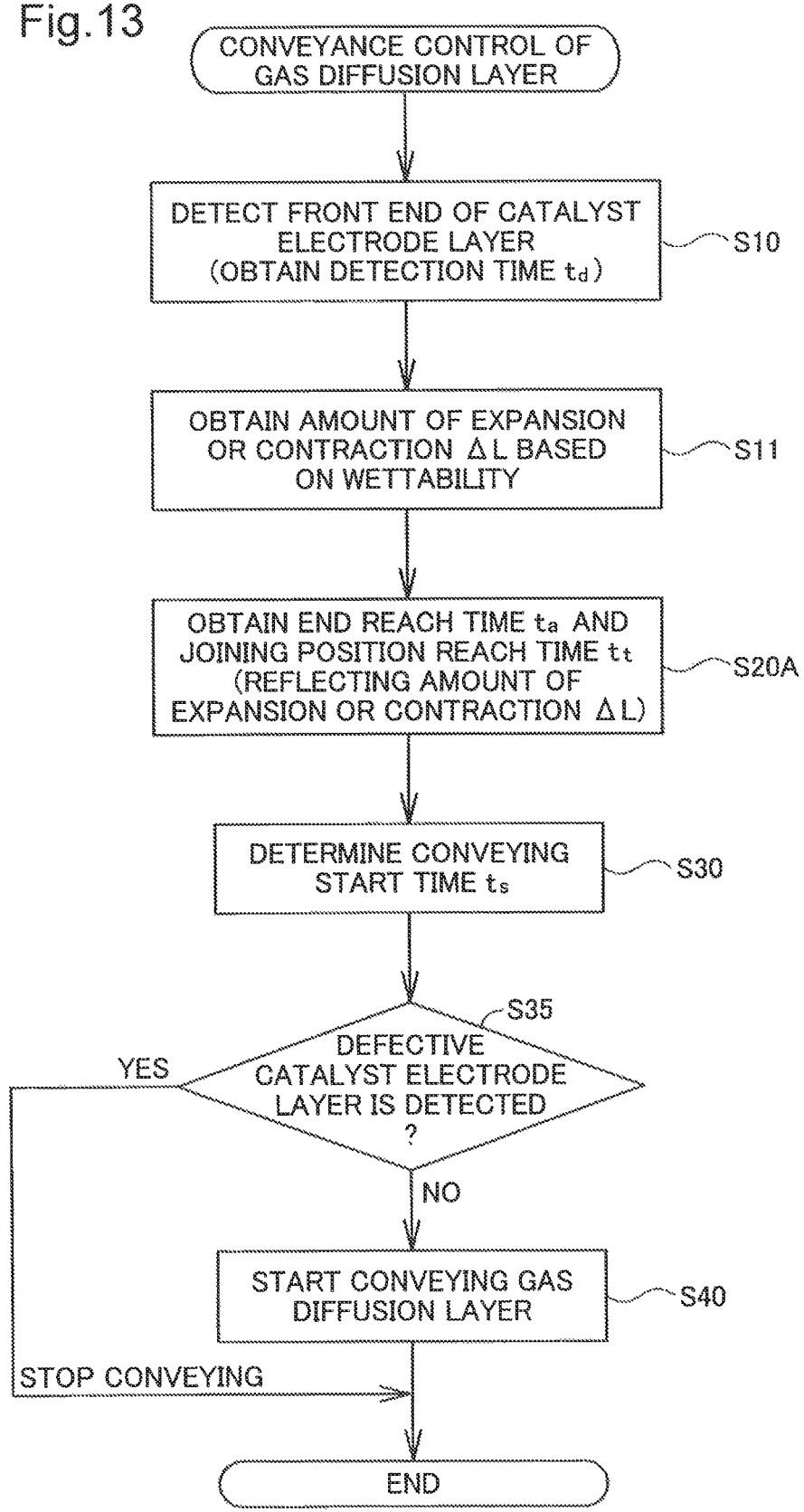
FIG. 13 is a flowchart showing a procedure of conveyance control of the gas diffusion layer by the controller of a third embodiment.

FIG. 13 is a flowchart showing a procedure of conveyance control of the gas diffusion layer performed by the controller 101 in a joining device according to a third embodiment of the invention. The procedure of conveyance control of the gas diffusion layer in the third embodiment is substantially similar to the procedure described in the second embodiment (FIG. 11), except addition of a process of detecting a defective catalyst electrode layer at step S35. The joining device of the third embodiment has the same configuration as that of the joining device 100A of the second embodiment (shown in FIG. 10).

In the joining device of the third embodiment, after determining the conveying start time $t_s$ at step S30 and before the current time reaches the conveying start time $t_s$, the controller 101 detects a defective second catalyst electrode layer 3 if any, based on the detection signal of the catalyst layer detector 130 at step S35. The controller 101 stops conveying the gas diffusion layer 7 in the current cycle in response to detection of a defective second catalyst electrode layer 3 and thereby suppresses the gas diffusion layer 7 from being wastefully joined with a defective membrane electrode assembly 5. The controller 101 detects a defective second catalyst electrode layer 3 as described below.

FIG. 14 is diagrams illustrating a method of detecting a defective second catalyst electrode layer 3 by the controller 101. A schematic front view illustrating one example of the strip body 5r having a defective second catalyst electrode layer 3 is shown in the upper section of FIG. 14. A graph showing a variation in detection signal output from the catalyst layer detector 130 during conveyance of the strip body 5r is shown in the lower section of FIG. 14, in relation to the upper section. An arrow PD indicating the conveying direction of the strip body 5r in the joining device is shown in the upper section of FIG. 14. The times when edges of the detection signal appear are sequentially shown as $t_1$ to $t_8$ in time series in the lower section of FIG. 14.

Streak-like clearances CR may be caused in the second catalyst electrode layer 3, for example, due to failed application of catalyst ink. Such clearances CR in a direction intersecting with the conveying direction appear as edges in the detection signal of the catalyst layer detector 130 of the third embodiment. In the example of detection signal of FIG. 14, edges representing the front end 3e and the rear end 3t of the second catalyst electrode layer 3 appear at the times $t_1$, $t_2$, $t_3$ and $t_8$, and edges representing the respective ends of two clearances CR appear at the times $t_4$, $t_5$, $t_6$ and $t_7$.

When a time interval (hereinafter also called "edge interval") when a rising edge appears after a falling edge in the detection signal is less than a predetermined interval, the controller 101 determines that the edge interval is attributed to a clearance CR in the second catalyst electrode layer 3. When the frequency of clearances CR is higher than a predetermined frequency or when a total edge interval attributed to clearances CR is greater than a predetermined threshold value, the controller 101 determines that the second catalyst electrode layer 3 is defective.

When no defective second catalyst electrode layer 3 is detected until the current time reaches the conveying start time $t_s$, conveyance of the gas diffusion layer 7 by means of the transfer 141 starts at the conveying start time $t_s$ at step S40 in FIG. 14. When subsequently detecting an edge interval that corresponds to the interval of the second catalyst electrode layers 3, the controller 101 detects its rising edge as the front end 3e of the second catalyst electrode layer 3 and starts conveyance control of the gas diffusion layer in a subsequent cycle at steps S10 to S40.

FIG. 15 is diagrams illustrating one example of timing chart in conveyance control of the gas diffusion layer in the joining device of the third embodiment. A graph showing one example of the detection signal which is the same as that of FIG. 14 is shown in the upper section of FIG. 15. A graph showing one example of time change in position of the transfer 141 is shown in the lower section of FIG. 15. A dashed-line graph in the lower section of FIG. 15 is a timing chart when conveyance of the gas diffusion layers 7 by means of the transfer 141 is not stopped but is continued.

In this example of timing chart, at a time $t_1$, the front end 3e of one second catalyst electrode layer 3 is detected at step S10. At a time $t_2$, the conveying start time $t_s$ is set to a time $t_3$ at steps S20 to S30. At the time $t_3$, conveyance of the gas diffusion layer 7 starts in the specified speed pattern of the transfer 141.

Subsequently, at a time $t_4$, the front edge 3e of a next second catalyst electrode layer 3 is detected at step S10. At a time $t_5$, the conveying start time $t_s$ is set to a time $t_7$ at steps S20 to S30. In the process of control in this cycle, however, an edge interval representing a clearance CR is detected at a time $t_6$ prior to the time $t_7$, and the controller 101 detects a defective second catalyst electrode layer 3. Accordingly conveyance of the gas diffusion layer 7 by means of the transfer 141 is stopped, and the transfer 141 remains stopped even after the time $t_7$.

The clearance CR is generally likely to occur in the vicinity of an end of the second catalyst electrode layer 3 in the conveying direction. Accordingly, the clearance CR is efficiently detectable by using the detection signal of the catalyst layer detector 130 prior to a start of moving the transfer 141. The joining device of the third embodiment distinctively detects edges in the detection signal as those attributed to clearances CR and those attributed to passage of the respective ends of second catalyst electrode layers 3. This accordingly suppresses a clearance CR from being mistakenly detected as the front edge 3e of a second catalyst electrode layer 3 and thereby reduces failure in joining of the gas diffusion layer 7.

As described above, the joining device of the third embodiment uses the detection signal of the catalyst layer detector 130 for detecting the position of the second catalyst electrode layers 3 in the strip body 5r to detect a defective second catalyst electrode layer 3. This readily and efficiently reduces the manufacturing failure of the fuel cell.

D. Modifications

D1. Modification 1

The joining devices 100 and 100A of the respective embodiments described above are used in the manufacturing process of the fuel cell to join the gas diffusion layers 7 with the strip body 5r which is the continuous strip member of the membrane electrode assembly 5 for fuel cell. Each of the joining devices 100 and 100A of the respective embodiments may also be configured as a joining device used in a process other than the manufacturing process of the fuel cell. Each of the joining devices 100 and 100A of the respective embodiments may be configured to convey another strip member instead of the strip body 5r and join a joining member other than the gas diffusion layer 7 with the strip member. In this latter case, a placement member usable as an indication of a joining position of the joining member may be placed on the strip member, in place of the second catalyst electrode layer 3.

D2. Modification 2

In the respective embodiments described above, the transfer 141 conveys the gas diffusion layers 7 in the specified speed pattern. Alternatively the transfer 141 may not be configured to convey the gas diffusion layers 7 in the specified speed pattern. The requirement is that the transfer 141 should be configured to convey the gas diffusion layer 7 such that the front end 7e of the gas diffusion layer 7 reaches the press point PP at the joining position reach time $t_r$. The configuration of the transfer 141 to perform the conveyance in the specified speed pattern, however, ensures easy and efficient positioning of the joining position of the gas diffusion layer 7 based on the joining position reach time $t_r$.

D3. Modification 3

In the respective embodiments described above, the transfer 141 linearly moves to convey the gas diffusion layers 7. Alternatively the transfer 141 may not be configured to linearly move to convey the gas diffusion layers 7. The configuration of the transfer 141 to linearly move to convey the gas diffusion layers 7, however, facilitates positioning of the joining positions of the gas diffusion layers 7.

D4. Modification 4

In the respective embodiments described above, the specified speed pattern of the transfer 141 includes the speed synchronizing period. The front end 7e of the gas diffusion layer 7 reaches the press point PP in this speed synchronizing period. Alternatively, the specified speed pattern of the transfer 141 may not include the speed synchronizing period, and the front end 7e of the gas diffusion layer 7 may not reach the press point PP in the speed synchronizing period. The configuration that the front end 7e of the gas diffusion layer 7 reaches the press point PP in the speed synchronizing period, however, enables the gas diffusion layer 7 to be smoothly joined with the strip body 5r and suppresses misalignment of the joining position of the gas diffusion layer 7.

D5. Modification 5

The second embodiment describes above detects the humidity between the detection point DP and the press point PP as the parameter related to expansion or contraction of the strip body 5r. The parameter related to expansion or contraction of the strip body 5r may, however, be a humidity in another area, a value representing an environment condition other than the humidity or a value representing a state of the strip body 5r. The parameter related to expansion or contraction of the strip body 5r may be, for example, temperature or atmospheric pressure in a space where the conveyance path of the strip body 5r is placed or may be wettability or strain of the electrolyte membrane 1 of the strip body 5r.

D6. Modification 6

Like the joining device of the second embodiment, the joining device of the third embodiment changes the detection time $t_d$ with reflecting the amount of expansion or contraction ΔL of the electrolyte membrane 1 according to the humidity (steps S11 and S20A in FIG. 13). The joining device of the third embodiment may alternatively be configured not to change the detection time $t_d$ with reflecting the amount of expansion or contraction ΔL of the electrolyte membrane 1 according to the humidity. The joining device of the third embodiment may perform the process of steps S10, S20 and S30 like the first embodiment, prior to the process of step S35 in conveyance control of the gas diffusion layer.

The invention is not limited to any of the embodiments, the examples and the modifications described above but may be implemented by a diversity of other configurations without departing from the scope of the invention. For example, the technical features of the embodiments, examples and modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

REFERENCE SIGNS LIST 1 electrolyte membrane
2 first catalyst electrode layer
3 second catalyst electrode layer
3e front end
3t rear end
5 membrane electrode assembly
5G membrane electrode assembly with diffusion layer
5r strip body
6 slip sheet
7 gas diffusion layer
7e front end
100, 100A joining device
101 controller
110 slip sheet peeling assembly
111 drive roller
112 pressure roller
113 slip sheet conveyance roller
120 tension adjuster
121 drive roller
122 pressure roller
125 tension sensor
125r rotating roller
130 catalyst layer detector
132 humidity detector
140 gas diffusion layer conveying assembly
141 transfer
142 drive unit
143 driveshaft
150 joining assembly
151 conveyance roller
152 joining roller
CL cutting line
CR clearance
DP detection point
EP end point
GA area in which gas diffusion layer is placed
PP press point
SP start position
TP end reach position

The invention claimed is:

1. A device that continually joins a plurality of joining members with a strip member, the device comprising:
a first conveying assembly configured to convey in a longitudinal direction the strip member on which a plurality of placement members as indications of joining positions of the joining members are arrayed in the longitudinal direction;
a second conveying assembly configured to convey the joining members to be joined with the strip member conveyed by the first conveying assembly;
a joining roller configured to apply pressure to the strip member and each of the joining members and join the joining member with the strip member at a meeting point of the strip member and the joining member;
a detector configured to detect passage of each of the placement members at a predetermined detection point on a conveyance path of the strip member;
a conveyance controller configured to control the first conveying assembly and the second conveying assembly and determine a reach time when each of the joining members reaches the meeting point by the second conveying assembly, based on a detection time when passage of each of the placement members is detected by the detector; and
a parameter acquirer configured to obtain a parameter related to an expanding or contracting state of the strip body, wherein:
the conveyance controller changes the detection time according to an amount, which is obtained from the parameter, of expansion or contraction of the strip body after passing the predetermined detection point, and determines the reach time based on the changed detection time,
the strip member is an electrolyte membrane, and
the parameter is humidity at a conveyance path of the strip member or humidity of the electrolyte membrane.

2. The device according to claim 1,
wherein the second conveying assembly linearly conveys each of the joining members toward the meeting point in a specified speed pattern to be joined with the strip member, and
the conveyance controller determines a start time when the second conveying assembly starts conveying the joining member, based on the reach time and the specified speed pattern.

3. The device according to claim 1,
wherein the detector detects passage of an end of each of the placement members, and
the conveyance controller detects a defective placement member, based on a time interval of detecting respective ends of the placement member, and controls the second conveying assembly to stop conveying the joining member in response to detection of the defective placement member.

4. The device according to claim 1,
wherein the strip member is an electrolyte membrane for a fuel cell,
the placement member is a catalyst electrode layer for the fuel cell, and
the conveyance controller determines the reach time such that a placement area of the joining member overlaps with a placement area of the catalyst electrode layer.

5. A method that continually joins a plurality of joining members with a strip member, the joining method comprising:
conveying in a longitudinal direction the strip member on which a plurality of placement members as indications of joining positions of the joining members are arrayed in the longitudinal direction;
obtaining a parameter related to an expanding or contracting state of the strip body;
detecting passage of each of the placement members at a predetermined detection point on a conveyance path of the strip member and obtaining a detection time when passage of each of the placement members is detected;

changing the detection time according to an amount, which is obtained from the parameter, of expansion or contraction of the strip body after passing the predetermined detection point;

determining a reach time when each of the joining members reaches the strip member, based on the detection time which is changed;

conveying each of the joining members to be joined with the strip member at the reach time; and applying pressure to the strip member and each of the joining members and joining the joining member with the strip member at a meeting point of the strip member and the joining member, wherein:

the strip member is an electrolyte membrane, and the parameter is humidity at a conveyance path of the strip member or humidity of the electrolyte membrane.

* * * * *